(12) United States Patent
Lee

(10) Patent No.: US 12,215,055 B2
(45) Date of Patent: Feb. 4, 2025

(54) STRENGTHENED GLASS MANUFACTURING APPARATUS AND STRENGTHENED GLASS MANUFACTURING METHOD USING THE SAME

(71) Applicant: SAMSUNG DISPLAY CO., LTD., Yongin-si (KR)

(72) Inventor: Hoi Kwan Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 122 days.

(21) Appl. No.: 17/338,519

(22) Filed: Jun. 3, 2021

(65) Prior Publication Data

US 2022/0002193 A1    Jan. 6, 2022

(30) Foreign Application Priority Data

Jul. 6, 2020 (KR) ........................ 10-2020-0082652

(51) Int. Cl.
 *C03C 21/00* (2006.01)
 *C03B 35/00* (2006.01)

(52) U.S. Cl.
 CPC ............ *C03C 21/003* (2013.01); *C03B 35/00* (2013.01)

(58) Field of Classification Search
 CPC ....... C03B 27/03; C03B 35/00; C03B 35/202; C03B 27/30; C03B 35/207; C03C 21/002; C03C 21/003; C03C 21/001; B25H 3/04; B65D 85/48
 See application file for complete search history.

(56) References Cited

U.S. PATENT DOCUMENTS

| | | | | |
|---|---|---|---|---|
| 2,695,475 A | * | 11/1954 | Ellis | C03B 27/067 219/650 |
| 3,972,704 A | * | 8/1976 | Loxley | C03B 19/066 65/355 |
| 4,054,641 A | * | 10/1977 | Carman | C03B 17/04 423/325 |
| 2016/0039587 A1 | * | 2/2016 | Wetherill | B25B 11/00 269/40 |
| 2016/0039588 A1 | * | 2/2016 | Sheehan | B25B 11/00 269/40 |
| 2016/0326051 A1 | * | 11/2016 | Kim | C03C 21/002 |
| 2016/0329598 A1 | * | 11/2016 | Schneider | C03C 3/125 |
| 2016/0332909 A1 | * | 11/2016 | Abbott, Jr. | C03C 21/002 |

(Continued)

FOREIGN PATENT DOCUMENTS

| | | | | | |
|---|---|---|---|---|---|
| CN | 107056078 A | * | 8/2017 | | |
| CN | 108373272 A | * | 8/2018 | ........... | C03C 21/002 |
| CN | 108516666 A | * | 9/2018 | ......... | C03B 23/0066 |

(Continued)

*Primary Examiner* — Alison L Hindenlang
*Assistant Examiner* — Steven S Lee
(74) *Attorney, Agent, or Firm* — Lewis Roca Rothgerber Christie LLP

(57) ABSTRACT

A strengthened glass manufacturing apparatus and a strengthened glass manufacturing method are provided. The strengthened glass manufacturing apparatus includes a strengthening chamber including a first chamber having a first space, a preheating chamber including a second chamber having a second space, the second space being different from the first space, and a first induction coil in the preheating chamber.

14 Claims, 18 Drawing Sheets

(56) References Cited

U.S. PATENT DOCUMENTS

2017/0334770 A1\* 11/2017 Luzzato ................ C03C 21/005

FOREIGN PATENT DOCUMENTS

| | | | | |
|---|---|---|---|---|
| CN | 108706891 | A \* | 10/2018 | ........... C03C 21/002 |
| CN | 109437598 | A \* | 3/2019 | |
| CN | 110526560 | A \* | 12/2019 | ........... C03B 27/012 |
| EP | 1604735 | B1 \* | 4/2017 | .......... B01J 19/0093 |
| JP | 59227733 | A \* | 12/1984 | ........... C03B 27/004 |
| JP | 08-333129 | | 12/1996 | |
| JP | 2004210615 | A \* | 7/2004 | ......... C03B 37/0146 |
| KR | 100864956 | B1 \* | 7/2000 | ........... C03C 21/002 |
| KR | 10-2009-0023678 | A | 3/2009 | |
| KR | 101000647 | B1 \* | 12/2010 | ........... C03B 35/207 |
| KR | 101000677 | B1 \* | 12/2010 | |
| KR | 10-2011-0026537 | A | 3/2011 | |
| KR | 20130095413 | A \* | 2/2012 | ........... C03C 21/002 |
| KR | 101120262 | B1 \* | 3/2012 | ............. C03B 5/235 |
| KR | 101143303 | B1 \* | 5/2012 | ........... C03C 23/007 |
| KR | 101406508 | B1 \* | 6/2014 | ........... C03B 27/012 |
| KR | 20140110364 | A \* | 9/2014 | ........... C03B 27/012 |
| KR | 20140125601 | A \* | 10/2014 | ........... C03C 21/001 |
| KR | 20150025386 | A \* | 3/2015 | ........... C03C 21/002 |
| KR | 20150074474 | A \* | 7/2015 | |
| KR | 20150076616 | A \* | 7/2015 | |
| WO | WO-2013011835 | A1 \* | 1/2013 | ............. C03B 5/021 |

\* cited by examiner

STRENGTHENED GLASS MANUFACTURING APPARATUS AND STRENGTHENED GLASS MANUFACTURING METHOD USING THE SAME

CROSS-REFERENCE TO RELATED APPLICATION

This application claims priority to and the benefit of Korean Patent Application No. 10-2020-0082652 filed on Jul. 6, 2020 in the Korean Intellectual Property Office (KIPO), the entire content of which is incorporated by reference herein.

BACKGROUND

1. Field

The present disclosure relates to a strengthened glass manufacturing apparatus and a strengthened glass manufacturing method using the same.

2. Description of the Related Art

Glass articles are widely used in electronic devices or construction materials including display devices. For example, a glass article is applied to a substrate of a flat panel display device such as a liquid crystal display (LCD), an organic light emitting display (OLED) and an electrophoretic display (EPD), or a cover window for protecting it.

In recent years, a foldable display device has been researched for user convenience. It is preferable that a glass article of the foldable display device have a thin thickness to alleviate bending stress caused by folding the foldable display device and strength to withstand external impact. Accordingly, attempts have been made to improve the strength of a thin glass article through thermal or chemical strengthening.

SUMMARY

Aspects of the present disclosure are directed towards a strengthened glass manufacturing apparatus capable of minimizing or reducing solidification of salts when chemically strengthening a glass article, and a strengthened glass manufacturing method using the same.

Aspects of the present disclosure are directed towards a strengthened glass manufacturing apparatus capable of reducing a processing time, and a strengthened glass manufacturing method using the same.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

In one or more embodiments, a strengthened glass manufacturing apparatus includes a strengthening chamber including a first chamber having a first space, a preheating chamber including a second chamber having a second space, the second space being different from the space, and a first induction coil in the preheating chamber.

In one or more embodiments, the strengthened glass manufacturing apparatus further includes a cassette to accommodate a target object to be processed. The cassette is to be inductively heated in the second space of the second chamber by the first induction coil and is to be loaded into the first space of the first chamber.

In one or more embodiments, the cassette includes a metallic material, and the first induction coil is to generate eddy currents in the cassette to heat the cassette.

In one or more embodiments, the metallic material includes stainless steel.

In one or more embodiments, the target object includes glass, and the strengthening chamber is to contain a molten salt to strengthen the glass.

In one or more embodiments, the molten salt is to have a temperature equal to or higher than 340° C. and equal to or lower than 390° C., and the cassette is to be preheated to a temperature equal to or higher than 330° C. and equal to or lower than 340° C.

In one or more embodiments, the first induction coil is in an upper portion of the preheating chamber.

In one or more embodiments, the strengthened glass manufacturing apparatus further includes a sliding plate between the strengthening chamber and the preheating chamber, and a second induction coil at the sliding plate to inductively heat a cassette.

In one or more embodiments, the strengthened glass manufacturing apparatus further includes a guide part extending in a horizontal direction from the strengthening chamber. Each of the preheating chamber and the sliding plate is configured to be substantially slidable along the guide part in a first direction.

In one or more embodiments, the sliding plate is configured to be placed under the preheating chamber such that the first induction coil and the second induction coil face each other.

In one or more embodiments, the preheating chamber is configured to slide along the guide part such that a lower portion of the preheating chamber faces an upper portion of the strengthening chamber.

In one or more embodiments, the strengthened glass manufacturing apparatus further includes an induction coil moving part configured to move the first induction coil from the preheating chamber to the strengthening chamber. The first induction coil surrounds an outer surface of the preheating chamber.

In one or more embodiments, the induction coil moving part is configured to move the first induction coil up and down to selectively surround an outer surface of the preheating chamber and/or an outer surface of the strengthening chamber.

In one or more embodiments, at least one of the preheating chamber or the strengthening chamber comprises a heating element.

In one or more embodiments, the strengthened glass manufacturing apparatus further includes a third induction coil in a lower portion of the strengthening chamber.

In one or more embodiments, the strengthening chamber has a first opening at an upper portion thereof, and the preheating chamber is to be above the strengthening chamber and has a second opening at a lower portion thereof.

In one or more embodiments, the strengthened glass manufacturing apparatus further includes a cassette transfer part to move a cassette from the preheating chamber to the strengthening chamber.

In one or more embodiments, a strengthened glass manufacturing method includes raising a temperature of a target object a first temperature range by inductively heating a cassette accommodating the target object, and chemically strengthening the target object, whose temperature has been raised, at a second temperature range higher than the first temperature range.

In one or more embodiments, the raising of the temperature of the target object to the first temperature range includes placing a first induction coil on a first side of the cassette and placing a second induction coil on a second side of the cassette.

In one or more embodiments, the strengthened glass manufacturing method further includes moving at least one induction coil in response to raising the temperature of the target object to the first temperature range.

The strengthened glass manufacturing apparatus and the strengthened glass manufacturing method according to various embodiments are capable of preventing or reducing the solidification of salts.

The strengthened glass manufacturing apparatus and the strengthened glass manufacturing method according to various embodiments are capable of performing a strengthening process in a reduced time.

The effects of the present disclosure are not limited to the aforementioned effects, and various other effects are included in the present specification.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
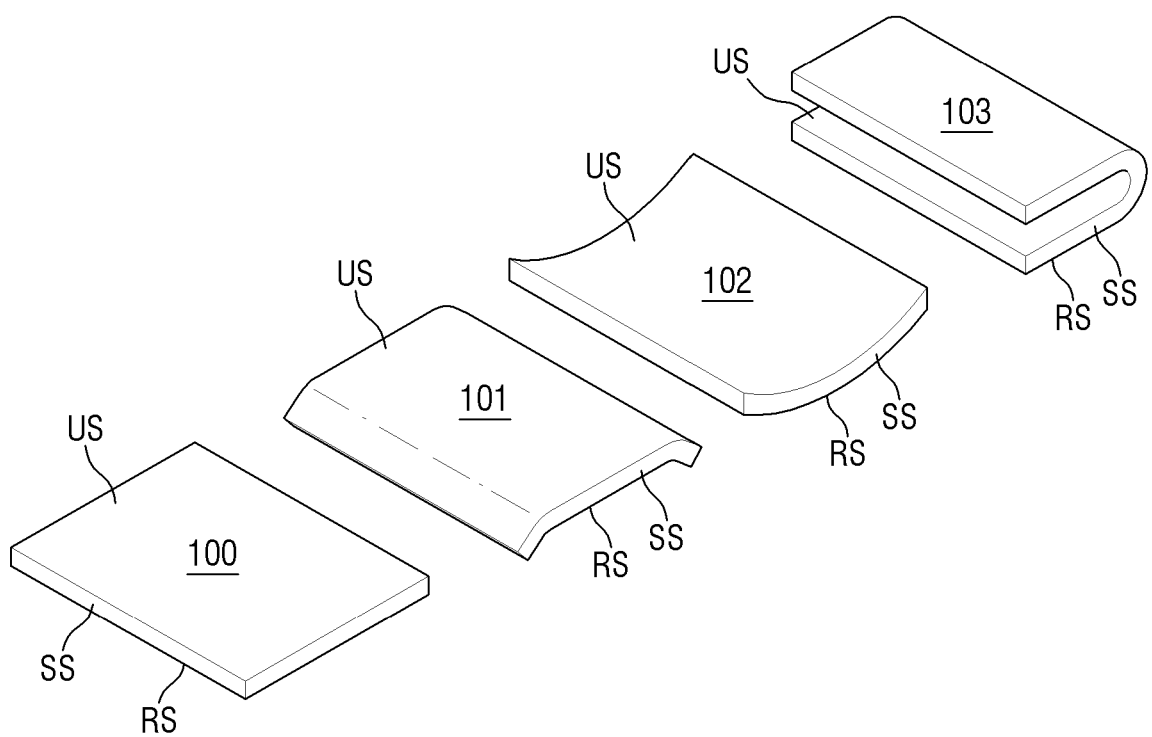
FIG. 1 is a perspective view of glass articles related to a strengthened glass manufacturing apparatus according to an embodiment.

The present disclosure will now be described more fully hereinafter with reference to the accompanying drawings, in which example embodiments of the disclosure are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art. The same reference numbers indicate the same components throughout the specification. In the attached figures, the thickness of layers and regions may be exaggerated for clarity.

As used herein, the singular forms "a," "an," and "the" are intended to include the plural forms as well, unless the context clearly indicates otherwise.

It will be further understood that the terms "includes," "including," "comprises," and/or "comprising," when used in this specification, specify the presence of stated features, acts, steps, operations, elements, and/or components, but do not preclude the presence or addition of one or more other features, acts, steps, operations, elements, components, and/or groups thereof.

As used herein, expressions such as "at least one of," "one of," and "selected from," when preceding a list of elements, modify the entire list of elements and do not modify the individual elements of the list.

As used herein, the term "and/or" includes any and all combinations of one or more of the associated listed items.

Further, the use of "may" when describing embodiments of the present disclosure refers to "one or more embodiments of the present disclosure".

It will also be understood that when a layer is referred to as being "on" another layer or substrate, it can be directly on the other layer or substrate, or intervening layers may also be present. In contrast, when an element is referred to as being "directly on" another element, there are no intervening elements present.

In the drawings, the relative sizes of elements, layers, and regions may be exaggerated and/or simplified for clarity. Spatially relative terms, such as "beneath," "below," "lower," "above," "upper," "bottom," "top," and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the terms "substantially," "about," and similar terms are used as terms of approximation and not as terms of degree, and are intended to account for the inherent deviations in measured or calculated values that would be recognized by those of ordinary skill in the art.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, example embodiments will be described in detail with reference to the accompanying drawings.

Figure 2:
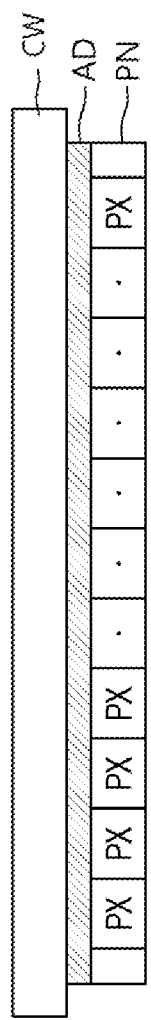
FIG. 2 is a cross-sectional example view illustrating a display device in which the glass article of FIG. 1 is applied as a cover window of the display device.
Figure 3:
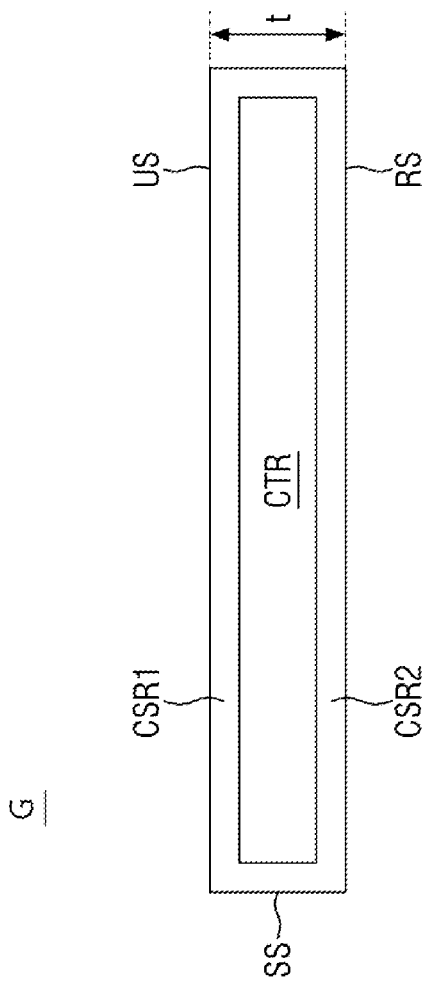
FIG. 3 is a cross-sectional view of the flat plate-shaped glass article of FIG. 1.
Figure 4:
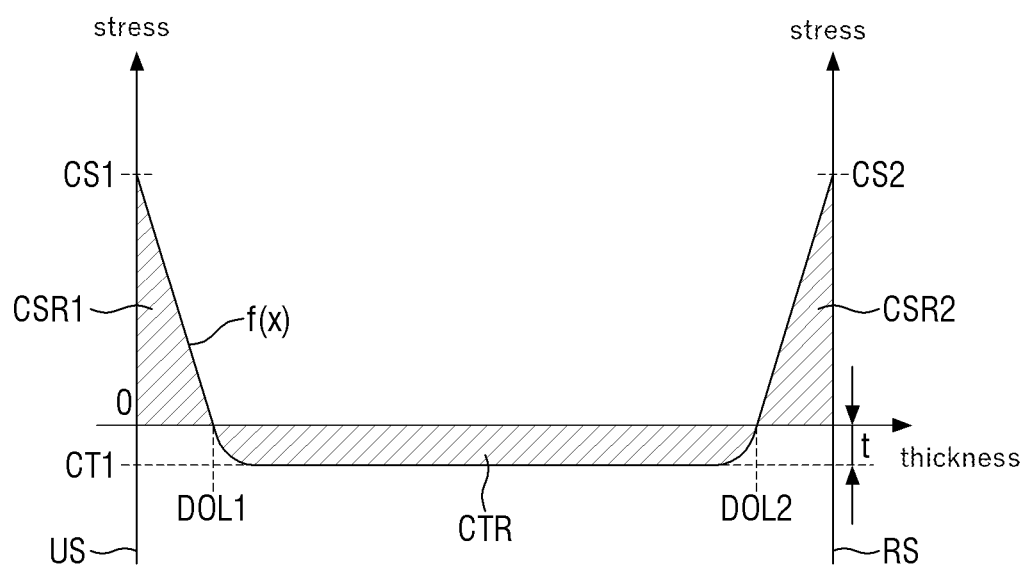
FIG. 4 is a graph showing the stress profile of the glass article of FIG. 3.
Figure 5:
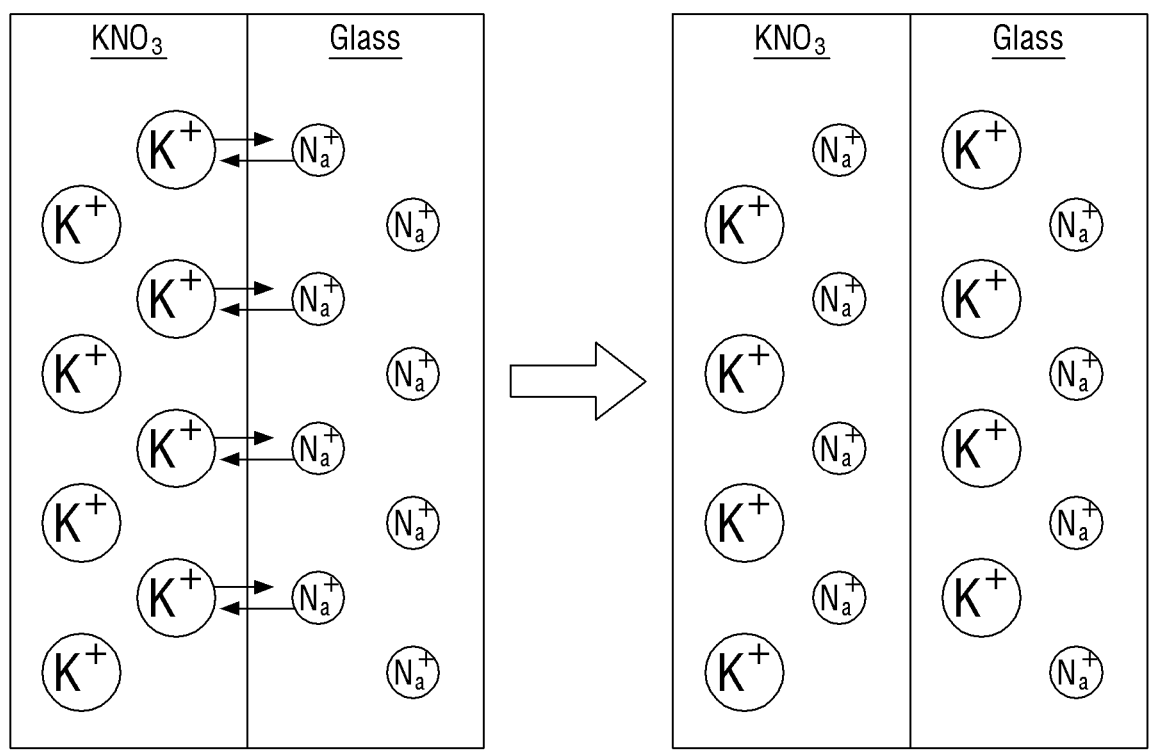
FIG. 5 is a schematic diagram showing an ion exchange process for strengthening a glass article according to an embodiment.

FIG. 1 is a perspective view of glass articles related to a strengthened glass manufacturing apparatus according to an embodiment. FIG. 2 is a cross-sectional example view illustrating a display device in which the glass article of FIG. 1 is applied as a cover window of the display device. FIG. 3 is a cross-sectional view of the flat plate-shaped glass article of FIG. 1. FIG. 4 is a graph showing the stress profile of the glass article of FIG. 3. FIG. 5 is a schematic diagram showing an ion exchange process for strengthening a glass article according to an embodiment.

A glass article G may be used as a window for protecting a display, a substrate for a display panel, a substrate for a touch panel, an optical member such as a light guide plate and/or the like in electronic devices including a display, such as, for example, a tablet personal computer (PC), a notebook PC, a smartphone, an electronic book, a television and a PC monitor as well as a refrigerator and a cleaning machine including a display screen. Glass may also be employed as a cover glass for a dashboard of a vehicle, a cover glass for solar cells, interior materials for construction materials, windows for buildings and houses, and/or the like.

It is desirable for the glass article G to have strong strength. For example, when glass is employed as a window, it is desirable to have a small (low) thickness to meet the requirements of high transmittance and lightweightness (low weight), and also have sufficient strength such that the glass article G is not easily broken by an external impact. Strengthened glass can be produced by, for example, chemical strengthening or thermal strengthening. Examples of strengthened glass are shown in FIG. 1. Referring to FIG. 1, the glass article G may have various suitable shapes. For example, the glass article G may include a glass article 100 having a flat plate shape, a glass article 101 with bent edges, a curved glass article 102 having curved sides or surfaces, a folded glass article 103 that is foldable about an axis, and/or the like.

The planar shape of the glass article G may be rectangular, but the present disclosure is not limited thereto. The glass article G may have various suitable shapes, such as a rectangle with rounded corners, a square, a circle, and/or an ellipse.

The glass article G includes a first surface US and a second surface RS opposite to the first surface US. The first surface US may be an upper surface of the glass article G, and the second surface RS may be a lower surface of the glass article G. The glass article G may further include side surfaces SS between the first surface US and the second surface RS. In one or more of the following embodiments, for ease of description, a flat plate having a rectangular shape in a plan view is described as an example of the glass article G, but the present disclosure is not limited thereto. For example, the glass article G may have any suitable shape.

Referring to FIG. 2, the glass article G of FIG. 1 may be applied as a cover window CW of a display device DD.

In one or more embodiments, the cover window CW is disposed on a display panel PN of the display device DD. The cover window CW may be bonded to the display panel PN via an optically transparent adhesive layer AD. The cover window CW serves to protect the display panel PN. As a main body of the cover window CW, a strengthened glass article G may be applied.

Examples of the display panel PN may include not only a self-light emitting display panel such as an organic light emitting display (OLED) panel, an inorganic electroluminescence (EL) display panel, a quantum dot light emitting display (QED) panel, a micro-LED display panel, a nano-LED display panel, a plasma display panel (PDP), a field emission display (FED) panel and/or a cathode ray tube (CRT) display panel, but also a light receiving display panel such as a liquid crystal display (LCD) panel and/or an electrophoretic display (EPD) panel. The display panel PN may also include a touch panel embedded therein.

The display device DD may be a foldable display device. In order to withstand stress caused by repetitive folding or unfolding operations, it is desirable for the glass article G applied to the cover window CW to be a strengthened glass article G having a thin thickness and improved durability.

Referring to FIGS. 3-5, the durability of the glass article G may be improved by an ion exchange process.

In more detail, as shown in FIGS. 3 and 4, the glass article G includes a first compressive region CSR1 that is extended from the first surface US to a first depth (first compression depth DOL1), and a second compressive region CSR2 that is extended from the second surface RS to a second depth (second compression depth DOL2). A tensile region CTR is disposed between the first compression depth DOL1 and the second compression depth DOL2. In one or more embodiments, a compressive region and a tensile region may be disposed between the opposed side surfaces SS of the glass article G in a similar manner.

The first compressive region CSR1 and the second compressive region CSR2 are resistant to an external impact to mitigate the occurrence of cracks or breakage of the glass article G. It can be understood that as the maximum compressive stresses CS1 and CS2 of the first and second compressive regions CSR1 and CSR2 are greater, the strength of the glass article G is greater. In other words, increasing the maximum compressive stresses CS1 and CS2 of the first and second compressive regions CSR1 and CSR2 increases the strength of the glass article G.

Because an external impact is usually transmitted through the surfaces US, RS and SS of the glass article G, it is advantageous to have the maximum compressive stresses CS1 and CS2 at the surfaces US, RS and SS of the glass article G in terms of durability. However, the present disclosure is not limited thereto.

In one or more embodiments, the maximum compressive stresses CS1 and CS2 of the first and second compressive regions CSR1 and CSR2 may be about 700 Mpa or more (e.g., 700 Mpa or more). As another example, the maximum compressive stresses CS1 and CS2 of the first and second compressive regions CSR1 and CSR2 may be in the range of about 800 MPa to about 1,050 MPa (e.g., 800 MPa to 1,050 MPa). As yet another example, the maximum compressive stresses CS1 and CS2 of the first and second compressive regions CSR1 and CSR2 may be in the range of about 850 MPa to about 1,000 MPa (e.g., 850 MPa to 1,000 MPa).

The first compression depth DOL1 and the second compression depth DOL2 suppress cracks or grooves formed in the first and second surfaces US and RS from propagating to the tensile region CTR inside the glass article G. As the first and second compression depths DOL1 and DOL2 are larger, it is possible to more efficiently prevent or reduce propagation of cracks and the like. In other words, increasing the first and second compression depths DOL1 and DOL2 improves suppression of cracks or grooves formed in the first and second surfaces US and RS from propagating to the tensile region CTR inside the glass article G.

For example, the first and second compression depths DOL1 and DOL2 may be in the range of about 20 μm to about 150 μm (e.g., 20 μm to 150 μm). As another example, the first and second compression depths DOL1 and DOL2 may be in the range of about 50 μm to about 100 μm (e.g., 50 μm to 100 μm). As yet another example, the first and second compression depths DOL1 and DOL2 may be in the range of about 70 μm to about 85 μm (e.g., 70 μm to 85 μm).

The first and second compression depths DOL1 and DOL2 may satisfy the following relational expression with respect to a thickness t of the glass article G:

$$DOL1, DOL2 \geq 0.1*t \quad \text{Mathematical Expression 1}$$

The glass article G has a neutral stress, where the stress value is substantially 0, at the first compression depth DOL1 and the second compression depth DOL2, and has a tensile stress in a more inward region. The tensile stress may remain the same or increase towards the center of the glass article G.

In the stress profile, the absolute value of the slope of the compressive stress may be greater than the absolute value of the slope of the tensile stress. The internal region of the glass article G may include a wide section that exhibits tensile stresses and substantially has an average slope of 0. The section in the tensile region CTR, which has the average slope of 0, may have a width (i.e., thickness of the glass article G) greater than the first and second compression depths DOL1 and DOL2, but the present disclosure is not limited thereto.

The tensile stress of the tensile region CTR may be balanced with the compressive stresses of the first and second compressive regions CSR1 and CSR2. That is, the total compressive stress of the glass article G may be the same as the total tensile stress thereof. The following relational expression may be established when the stress profile of the glass article G is represented as a function f(DR1).

$$\int_0^t f(x)dx = 0 \quad \text{Mathematical Expression 2}$$

In the case of the glass article G in which the first and second compressive regions CSR1 and CSR2 have the same maximum compressive stress CS1 and CS2 and the same compression depth DOL1 and DOL2, the profiles thereof are approximated in a triangular shape, and the profile of the tensile region CTR is substantially approximated in a rectangular shape, the following relational expression may be established.

$$CT1 = (CS1*DOL1)/(t - 2*DOL1) \quad \text{Mathematical Expression 3}$$

In Mathematical Expression 3, CT1 represents the maximum tensile stress in the tensile region CTR, and CS1 represents the maximum compressive stress in the first compressive region CSR1.

The greater the magnitude of the tensile stress in the glass article G, the more likely the fragments are to be vigorously released when the glass article G is broken, and the more likely the glass article G is to be broken from the inside. The maximum tensile stress that meets a frangibility criterion of the glass article G may satisfy the following relational expression.

$$CT1 \leq -37.6*\ln(t) + 48.7 \quad \text{Mathematical Expression 4}$$

In Mathematical Expression 4, CT1 is indicated in MPa, the thickness t is indicated in mm, and ln(t) is the natural logarithm of the thickness t.

The maximum tensile stress CT1 of the glass article G may satisfy the condition of Mathematical Expression 4 when the maximum tensile stress CT1 falls in the range defined in the following Mathematical Expression 5.

$$-37.6*\ln(t) + 10 \leq CT1 \leq -37.6*\ln(t) + 48 \quad \text{Mathematical Expression 5}$$

The stress profile shown in FIG. 4 may be realized through an ion exchange process.

In order to increase the strength of the glass article G, the compressive stresses CS1 and CS2 and the compression depths DOL1 and DOL2 may be increased. However, when the total compressive stress increases, the tensile stress also increases according to Mathematical Expression 2 or Mathematical Expression 3. In order to meet the frangibility criterion and obtain improved strength, the stress profile is adjusted to increase the maximum compressive stresses CS1 and CS2 and the compression depths DOL1 and DOL2, and to decrease the total compressive stress (e.g., area of the compressive regions of FIG. 4). Adjusting the stress profile of the glass article G may be controlled through an ion exchange process, a heat treatment process, a post-treatment process, and/or the like.

The ion exchange process is a process of exchanging ions in the glass article G with other ions. By performing the ion exchange process, the ions at or near the surface US, RS, SS of the glass article G can be replaced or exchanged with larger ions having the same valence or oxidation state. For example, when the glass article G contains a monovalent alkali metal such as Li+, Na+, K+ and Rb+, monovalent cations on the surface may be replaced by Na+, K+, Rb+, or Cs+ ions with a larger ionic radius.

Referring to FIG. 5, when the glass containing sodium ions is exposed to potassium ions by, for example, immersing the glass in a molten salt bath containing potassium nitrate (KNO3), sodium ions in the glass are discharged to the outside and the potassium ions may replace them. The exchanged potassium ions generate compressive stress because they have a larger ionic radius than sodium ions. The greater the amount of potassium ions exchanged, the greater the compressive stress. Because the ion exchange takes place through the surface of the glass, the amount (i.e., density) of potassium ions on the glass surface is the greatest. Although some of the exchanged potassium ions may diffuse into the glass to increase the compression depth, the amount (density) thereof may generally decrease as it goes away from the surface (i.e., as distance into the glass from the surface of the glass increases). Thus, the glass may have a stress profile that has the greatest compressive stress on the surface and decreases toward the inside of the glass. However, the present disclosure is not limited to the above examples. The stress profile may be modified depending on the temperature, time, number of times, presence or absence of heat treatment and/or the like of the ion exchange process.

The ion exchange process described above may be performed by a strengthened glass manufacturing apparatus 1, which will be described in more detail below. Hereinafter, the strengthened glass manufacturing apparatus 1 according to an embodiment will be described in more detail.

Figure 6:
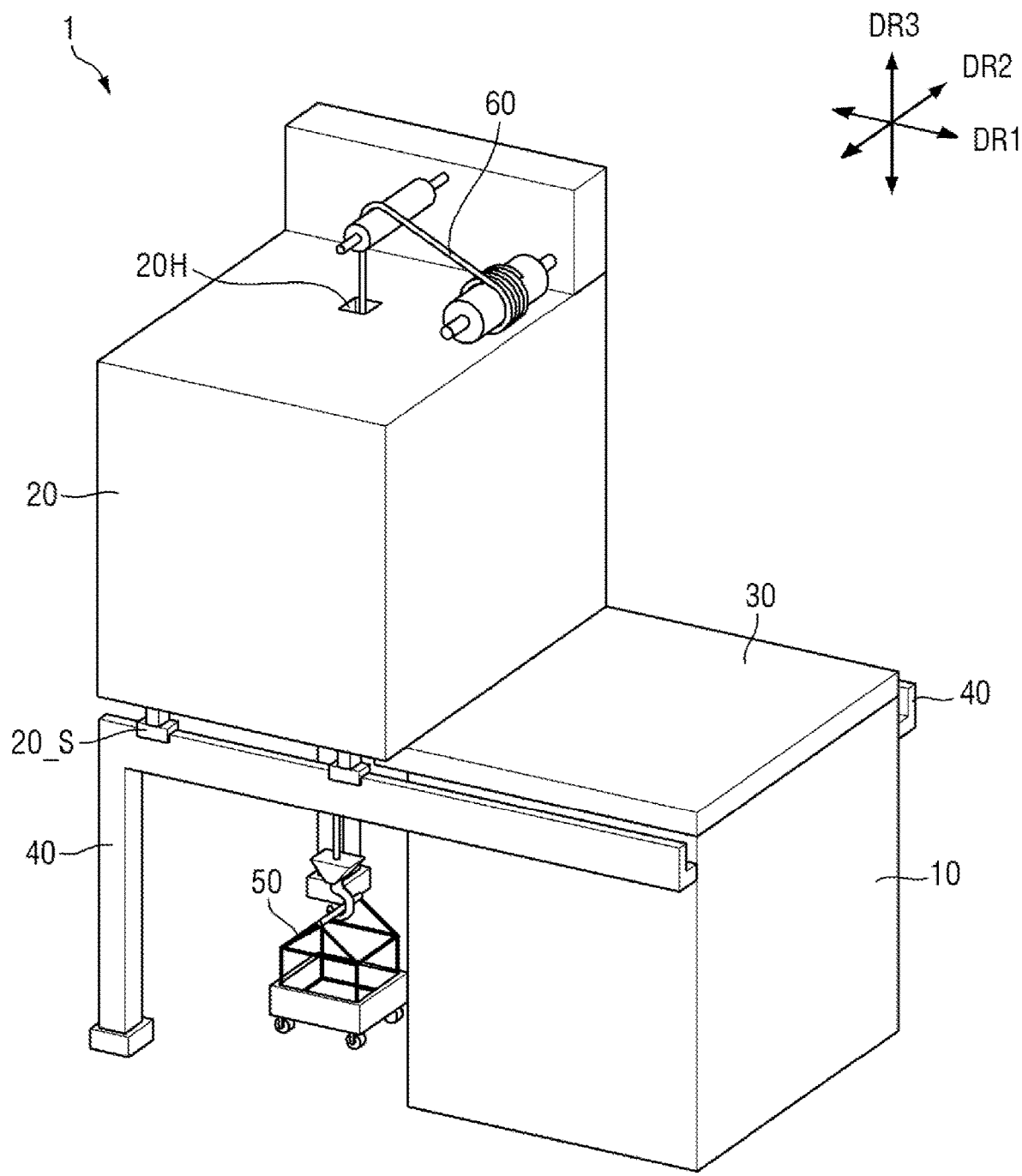
FIG. 6 is a perspective view of a strengthened glass manufacturing apparatus according to an embodiment.
Figure 7:
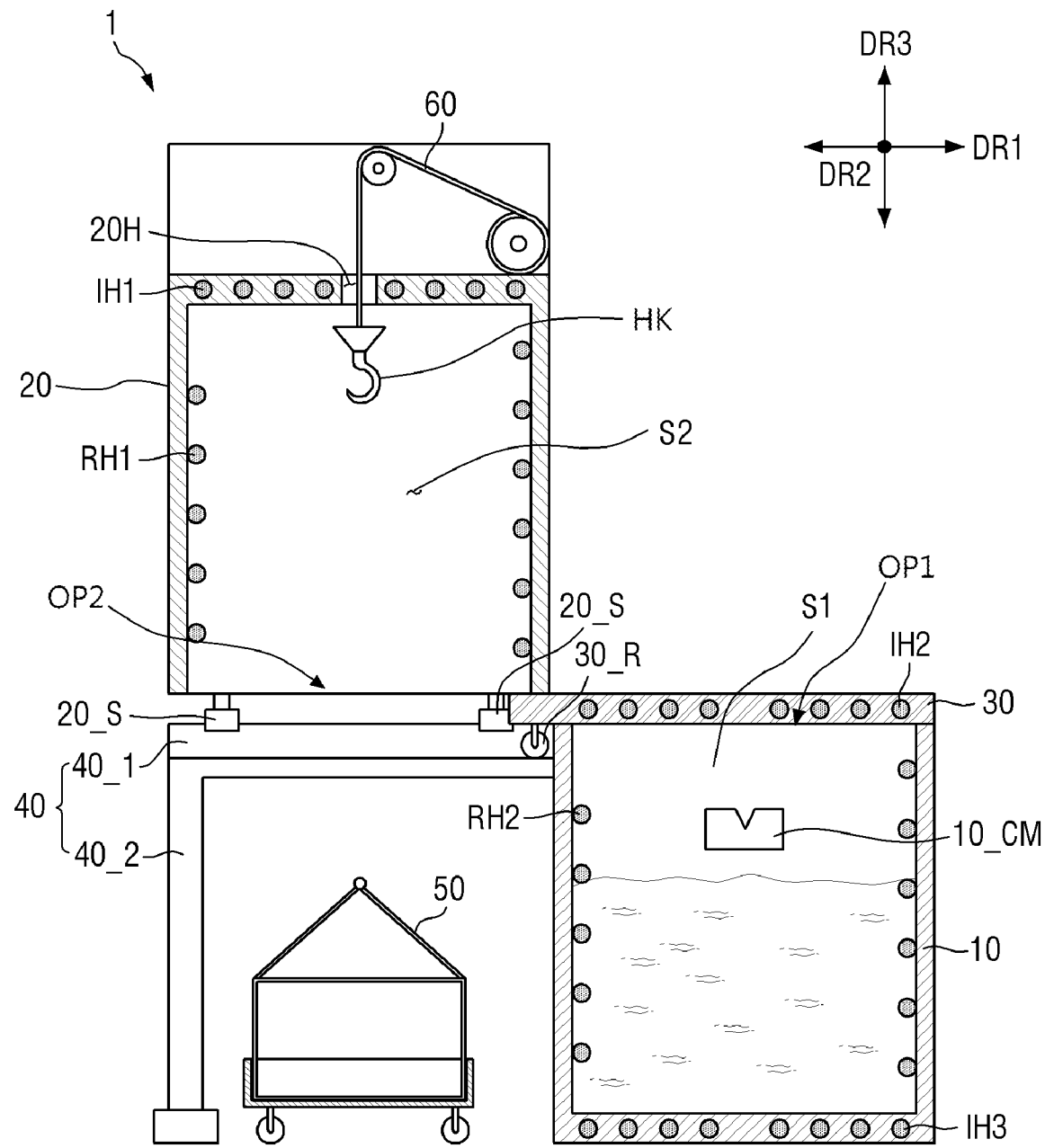
FIG. 7 is a cross-sectional view of the strengthened glass manufacturing apparatus of FIG. 6.
Figure 8:
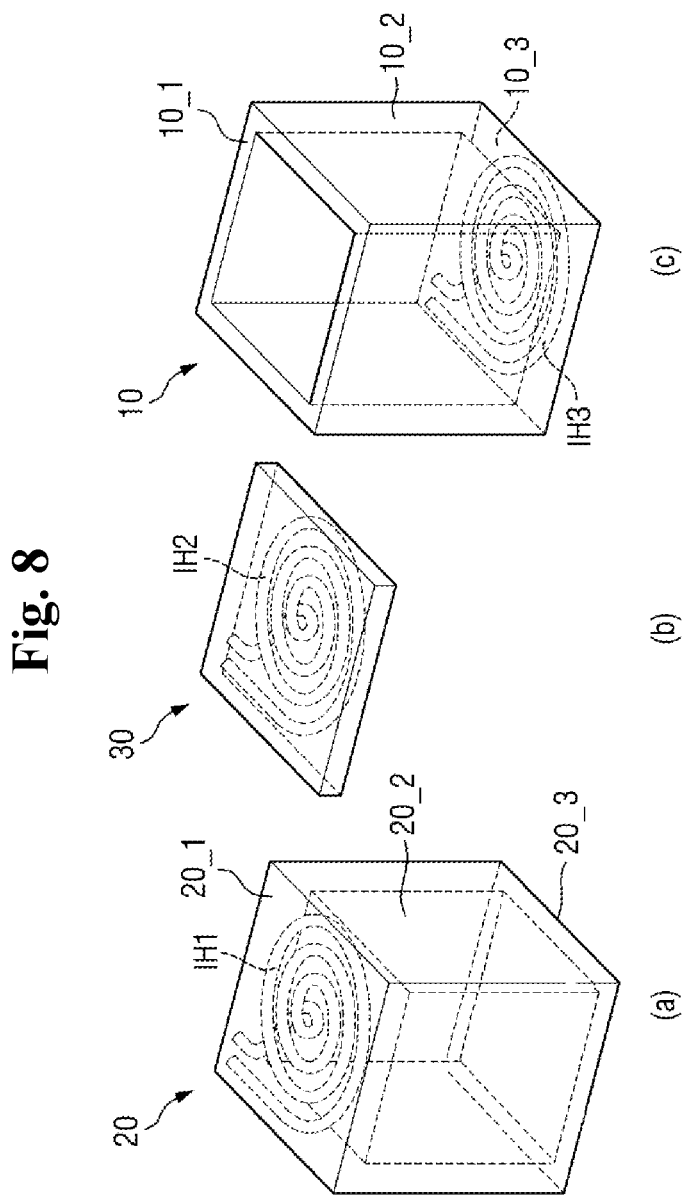
FIG. 8 is a perspective view of a strengthening chamber, a sliding plate and a preheating chamber of FIG. 6.

FIG. 6 is a perspective view of a strengthened glass manufacturing apparatus according to an embodiment. FIG. 7 is a cross-sectional view of the strengthened glass manufacturing apparatus of FIG. 6. FIG. 8 is a perspective view of a strengthening chamber, a sliding plate and a preheating chamber of FIG. 6.

A first direction DR1, a second direction DR2, and a third direction DR3 cross each other in different directions. The first direction DR1 may be a horizontal direction, the second direction DR2 may be a vertical direction, and the third direction D3 may be a height direction (thickness direction). The third direction DR3 may include an upward direction toward the upper side or top of FIG. 6 and a downward direction toward the lower side or bottom of FIG. 6. However, the directions are examples, and the present disclosure is not limited to those mentioned above.

The following strengthened glass manufacturing apparatus 1 includes a device for chemically strengthening glass. Glass articles manufactured by the strengthened glass manufacturing apparatus 1 may be the glass articles illustrated in FIG. 1, but the present disclosure is not limited thereto.

Referring to FIGS. 6-8, the strengthened glass manufacturing apparatus 1 includes a strengthening chamber 10, a preheating chamber 20, and a first induction coil IH1. The strengthened glass manufacturing apparatus 1 may further include a sliding plate 30, a guide part 40, a cassette 50, a cassette transfer part 60, a second induction coil IH2, a third induction coil IH3, and a heating element RH.

The strengthening chamber 10 has a space S1 in a first chamber. The space S1 of the first chamber may be recessed downward by a set depth (e.g., a predetermined depth) and may be in communication with the outside. In other words, the strengthening chamber 10 may define an interior volume (or space S1) that may be accessible from the outside. The strengthening chamber 10 may include an upper portion 10_1 that is at least partially opened to form a first opening OP1 through which the cassette 50 is loaded/unloaded, a lower portion 10_3 that is flat and faces the upper portion 10_1, and at least one sidewall 10_2 that is connected to the edge of the lower portion 10_3 and extends upward (e.g., extends upward to the upper portion 10_1). The first opening OP1 may be formed to open (e.g., completely open) the upper portion 10_1 of the strengthening chamber 10. A molten salt for strengthening glass may be contained in the space S1 of the first chamber. The molten salt may include potassium nitrate. The molten salt may be in a first temperature range. The first temperature range may be between about 340° C. and about 390° C. (e.g., between 340° C. and 390° C.). The strengthening chamber 10 may include a water tank for containing the molten salt. The strengthening chamber 10 may include a cassette mounting portion 10_CM arranged at a set height (e.g., a predetermined height) from the bottom of the space S1 of the first chamber to mount the cassette 50.

The preheating chamber 20 is disposed on or at one side of the strengthening chamber 10. The one side of the strengthening chamber 10 may be the upper side of the strengthening chamber 10. In one or more embodiments, the preheating chamber 20 may be disposed above the strengthening chamber 10, and the preheating chamber 20 may be movable along the guide part 40, which will be described in more detail below, in the first direction DR1. The preheating chamber 20 has a space S2 in a second chamber, which communicates with the outside. The space S2 of the second chamber may be recessed upward by a set depth (e.g., a predetermined depth), and may be in communication with the outside. In other words, the preheating chamber 20 may define an interior volume (or space S2) that may be accessible from the outside. The preheating chamber 20 may include a lower portion 20_3 that is at least partially opened to form a second opening OP2 through which the cassette 50 is loaded/unloaded, an upper portion 20_1 that is flat and faces the lower portion 20_3 and at least one sidewall 20_2 that is connected to the edge of the upper portion 20_1 and extends downward (e.g., extends downward to the lower portion 20_3). The second opening OP2 may be formed to completely open the lower portion 20_3 of the preheating chamber 20. As the preheating chamber 20 moves, the lower portion 20_3 of the preheating chamber 20 may be disposed to face the upper portion 10_1 of the strengthening chamber 10 or may be disposed to be shifted from (e.g., offset from) the upper portion 10_1 thereof. Accordingly, the first opening OP1 and the second opening OP2 may be disposed to face each other or may be disposed to be shifted from (e.g., offset from) each other. For example, the preheating chamber 20 may move between a first configuration where the first opening OP1 and the second opening OP2 overlap in the third direction DR3 and a second configuration where the first opening OP1 and the second opening OP2 do not overlap in the third direction DR3. The preheating chamber 20 may provide a space for preheating the cassette 50, a hook HK, and a target object accommodated in the cassette 50, which will be described in more detail below. The preheating chamber 20 may include one or more sliding members 20_S that are disposed at the edge of the opened lower portion 20_3 and are slidably coupled to the guide part 40 which will be described in more detail below.

In one or more embodiments, the strengthening chamber 10 and the preheating chamber 20 are exemplified to have a rectangular shape, but the shapes of the strengthening chamber 10 and the preheating chamber 20 are not limited thereto. For example, the strengthening chamber 10 and the preheating chamber 20 may be any suitable shape defining an interior volume for loading/unloading the cassette 50. In one or more embodiments, the strengthening chamber 10 and/or the preheating chamber 20 may have a shape of a polygonal prism or a cylinder.

The cassette 50 accommodates a target object to be processed. The target object may include glass. In one or more embodiments, the cassette 50 may include at least one frame having a plurality of spaces for mounting target objects. For example, each of the plurality of spaces may accommodate a target object mounted on a portion of the at least one frame. In one or more embodiments, the cassette 50 may be transferred into the preheating chamber 20 from the outside, preheated in the preheating chamber 20, and then loaded into the strengthening chamber 10 (e.g., loaded into the strengthening chamber 10 from the preheating chamber 20). The preheating may be performed by induction heating and/or resistance heating. The cassette 50 may include a conductor such as metal, which is a material suitable for induction heating. In one or more embodiments, the cassette 50 may include stainless steel, and may be preheated to have a temperature in a second temperature range in the preheating chamber 20. The second temperature range may be lower than the first temperature range, or may at least partially overlap the first temperature range. The difference between the first temperature range and the second temperature range may be about 5° C. to about 30° C. (e.g., 5° C. to 30° C.). The second temperature range may be between about 325° C. and about 340° C. (e.g., between 325° C. and 340° C.), or between about 330° C. and about 335° C. (e.g., between 330° C. and 335° C.). In the preheating chamber 20, the hook HK of the cassette transfer part 60, which will be described in more detail below, may also be preheated to have a temperature in the second temperature range together with the cassette 50.

The cassette transfer part 60 moves the cassette 50 in at least one direction. For example, the cassette transfer part 60 may transfer the cassette 50 mounted on an external tray into the space S2 in the second chamber of the preheating chamber 20, and may load the cassette 50 preheated in the preheating chamber 20 into the space S1 in the first chamber of the strengthening chamber 10. In one or more embodiments, the cassette transfer part 60 may be arranged to pass through a cable through hole 20H formed in the upper portion of the preheating chamber 20. The cassette transfer part 60 may be integrally connected to the preheating chamber 20 to move together with the preheating chamber 20 when the preheating chamber 20 moves. The cassette transfer part 60 may include the hook HK for hanging the cassette 50. The hook HK may include a conductor such as metal. In one or more embodiments, the hook HK may include stainless steel. However, the present disclosure is not limited thereto and any suitable material may be used for the hook HK.

The guide part 40 may extend from the strengthening chamber 10 in the first direction DR1. The first direction DR1 may be the horizontal direction. In one or more embodiments, the guide part 40 may include a guide rail frame 40_1 that extends in the horizontal direction and has one end fixed to the strengthening chamber 10, and a support frame 40_2 that is connected to the other end of the guide rail frame 40_1 and extends in the vertical direction. The guide rail frame 40_1 may include one or more rails for guiding the movement of the preheating chamber 20 and/or the sliding plate 30 in the first direction DR1. In one or more embodiments, a rail of the guide rail frame 40_1 may be adjacent to the strengthening chamber 10 and extend along the end of strengthening chamber 10 in the first direction DR1 to a position below the preheating chamber 20 and/or the sliding plate 30.

The sliding plate 30 slides along the guide part 40 in the first direction DR1. The sliding plate 30 may open/close the first opening OP1 of the strengthening chamber 10. In one or more embodiments, the sliding plate 30 may have a rectangular shape in the plan view. The sliding plate 30 may have a size larger than that of the strengthening chamber 10 in the plan view. The sliding plate 30 may include a roller 30_R for sliding, on its one side adjacent to the preheating chamber 20.

The first induction coil IH1 may be arranged at the preheating chamber 20, or in the vicinity of the preheating chamber 20. The first induction coil IH1 directly heats the cassette 50 and/or the hook HK using induction heating. The induction heating is a method of generating eddy currents in a target object to be heated by electromagnetic induction, and heating the target object by Joule heating caused by the generated eddy currents and the resistance of the target object, and hysteresis loss. In one or more embodiments, the first induction coil IH1 may be disposed in the upper portion of the preheating chamber 20 as shown in FIGS. 7 and 8A. Specifically, the first induction coil IH1 may be buried in the upper portion of the preheating chamber 20 in a shape of a pancake coil spirally wound on a plane that is parallel to the first direction DR1 and the second direction DR2. In some embodiments, the first induction coil IH1 may be disposed inside and/or outside the preheating chamber 20.

The second induction coil IH2 is disposed at the sliding plate 30 to inductively heat the cassette 50 and/or the hook HK. For example, the induction coil IH2 is disposed in or on a surface of the sliding plate 30 to inductively heat the cassette 50 and/or the hook HK. The second induction coil IH2 may be disposed parallel to the first induction coil IH1. In one or more embodiments, the second induction coil IH2 may be buried in the sliding plate 30 as shown in FIGS. 7 and 8B. Specifically, the second induction coil IH2 may be disposed inside the sliding plate 30 in a shape of a pancake coil spirally wound on a plane parallel to the first direction DR1 and the second direction DR2.

The third induction coil IH3 may be arranged at the strengthening chamber 10, or in the vicinity of the strengthening chamber 10. The third induction coil IH3 directly heats the cassette 50 and/or the hook HK using induction heating. In one or more embodiments, the third induction coil IH3 may be disposed in the lower portion 10_3 of the strengthening chamber 10 as shown in FIGS. 7 and 8C. Specifically, the third induction coil IH3 may be buried in the lower portion 10_3 of the strengthening chamber 10 in a shape of a pancake coil spirally wound on a plane parallel to the first direction DR1 and the second direction DR2. In some embodiments, the third induction coil IH3 may be disposed inside and/or outside the strengthening chamber 10.

The first induction coil IH1, the second induction coil IH2, and/or the third induction coil IH3 may be disposed in parallel with each other. That is, the cassette 50 and/or the hook HK may be disposed between the first induction coil IH1 and the second induction coil IH2 or between the second induction coil IH2 and the third induction coil IH3, and may be heated by transverse flux induction heating. At this time, the first induction coil IH1, the second induction coil IH2 and/or the third induction coil IH3 may be driven so that alternating magnetic fields may be applied to the cassette 50 and/or the hook HK, and the directions of the alternating magnetic fields applied to the cassette 50 and/or the hook HK may coincide with each other.

In one or more embodiments, a pancake-shaped coil is exemplified as the first, second and third induction coils IH1, IH2 and IH3, but the present disclosure is not limited thereto. The first, second and third induction coils IH1, IH2 and IH3 may be arranged in various suitable shapes such as a round shape, a rectangular shape, and a spiral/helical shape.

The first, second and third induction coils IH1, IH2 and IH3 may include at least one of copper, nickel, brass, cobalt, aluminum, iron, silver, carbon fiber, platinum, tungsten, graphite, silicon, or an alloy thereof.

The driving frequencies of the first, second and third induction coils IH1, IH2 and IH3 may include low frequencies ranging from about 50 Hz to about 60 Hz (e.g., 50 Hz to 60 Hz), medium frequencies ranging from about 100 Hz to about 10 kHz (e.g., 100 Hz to 10 kHz), high frequencies ranging from about 10 kHz to about 500 kHz (e.g., 10 kHz to 500 kHz), and radio frequencies ranging from about 100 kHz to about 500 kHz (e.g., 100 kHz to 500 kHz).

The heating element RH may be disposed in the strengthening chamber 10 and/or the preheating chamber 20. The heating element RH may indirectly heat the cassette 50, glass accommodated in the cassette 50, and/or the hook HK using resistance heating. Unlike the induction heating which directly heats the target object, the resistance heating refers to a method of indirectly heating the target object through convection or thermal radiation using Joule heating that occurs in the heating element RH itself by applying a current to the heating element RH. Accordingly, the first, second and third induction coils IH1, IH2 and IH3 directly and selectively heat only the cassette 50 and a coil including a conductor, whereas the heating element RH entirely heats the inside of the strengthening chamber 10 and the inside of the preheating chamber 20, thereby indirectly heating the cassette 50, the glass accommodated in the cassette 50, and the hook HK. The heating element RH may include a metallic heating element RH such as iron, chromium, aluminum, nickel, tungsten, tantalum, molybdenum, or platinum. Further, the heating element RH may include a nonmetallic heating element RH such as silicon carbide, molybdenum dioxide, lanthanum chloride, or carbon graphite. Furthermore, the heating element RH may include an electric heating cable, a ceramic heater and a sheath heater including a metallic heating wire and an inorganic insulating material. In one or more embodiments, the heating elements RH may be formed of a coiled heating wire, and may be disposed on inner sidewalls forming or defining the spaces S1 and S2 in the first and second chambers of the strengthening chamber 10 and the preheating chamber 20 respectively. Hereinafter, for convenience of description, the heating element RH disposed in the space S2 in the second chamber of the preheating chamber 20 is referred to as a first heating element RH1, and the heating element RH disposed in the space S1 in the first chamber of the strengthening chamber 10 is referred to as a second heating element RH2.

FIGS. 9-12 are cross-sectional views illustrating the operation of the strengthened glass manufacturing apparatus of FIG. 6.

Figure 9:
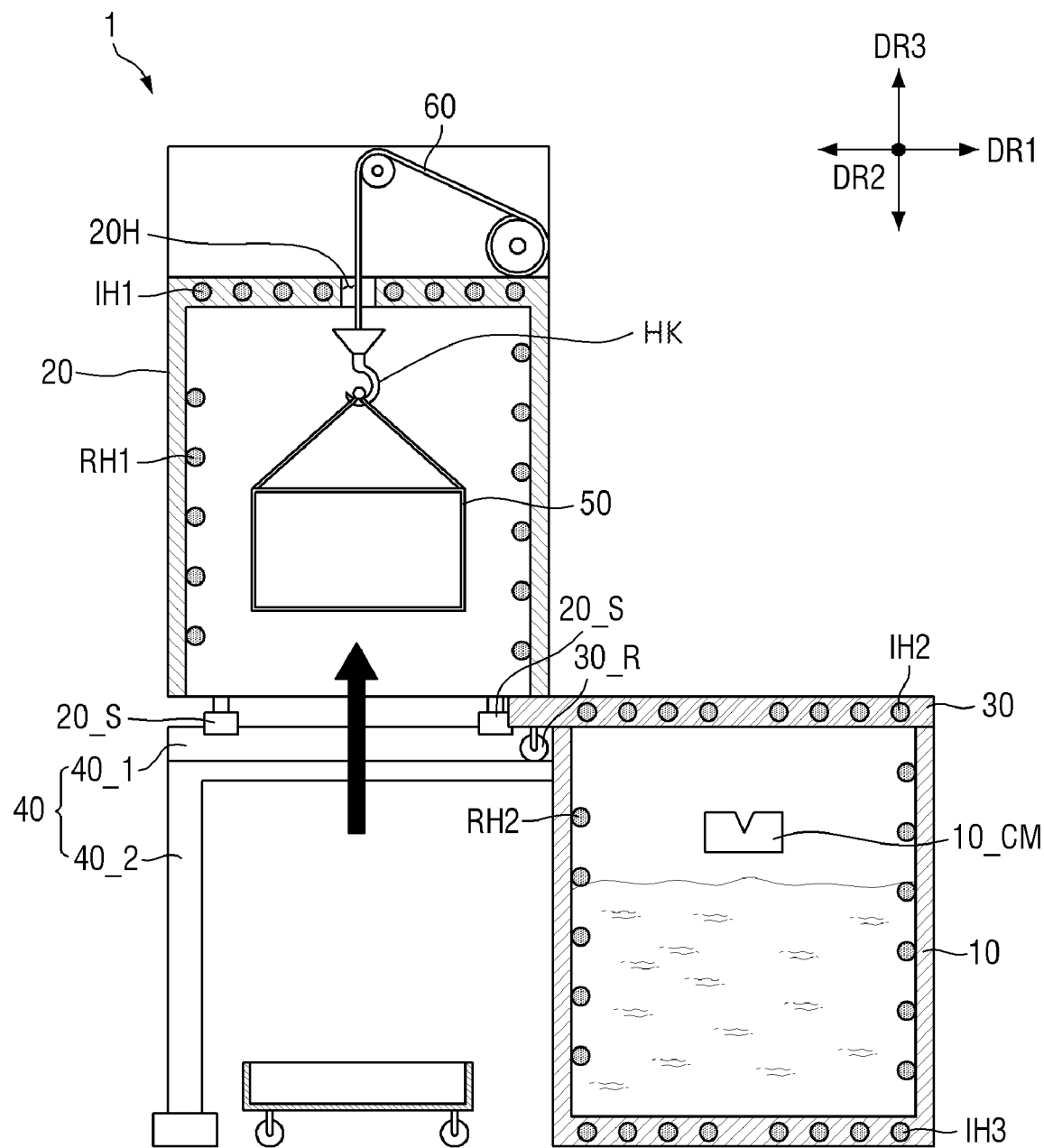
FIGS. 9-12 are cross-sectional views illustrating the operation of the strengthened glass manufacturing apparatus of FIG. 6.
Figure 10:
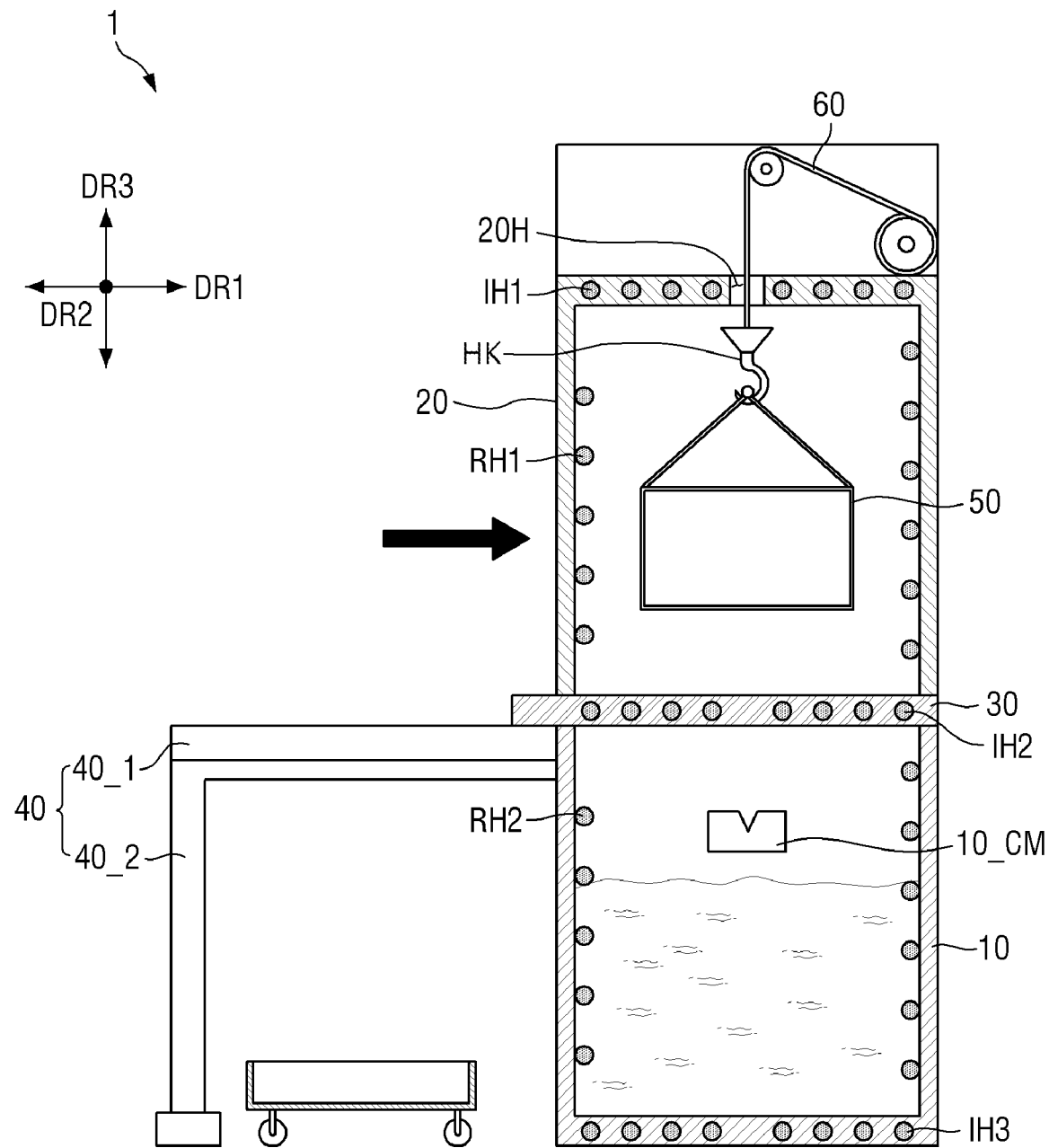
Figure 11:
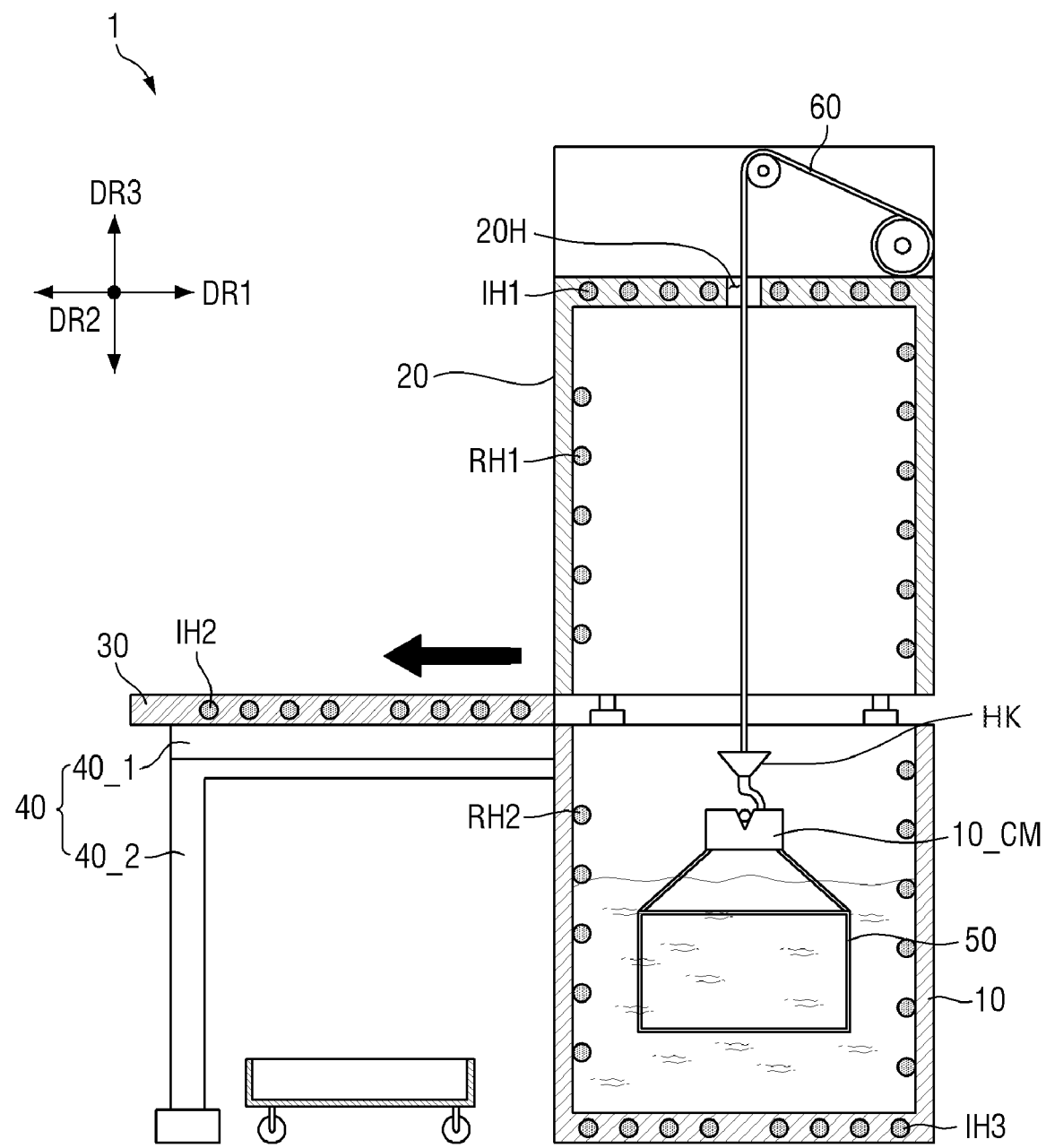
Figure 12:
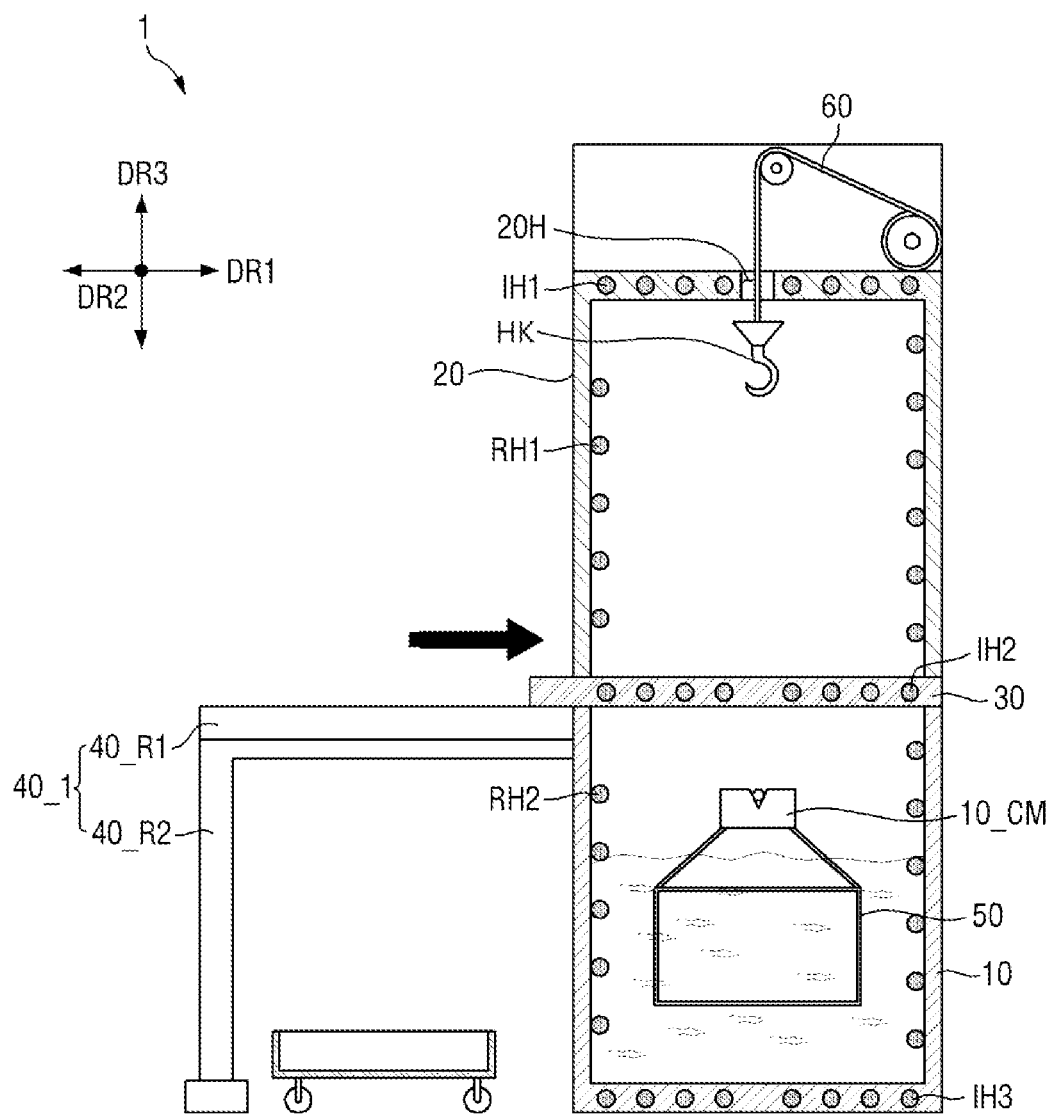

FIG. 9 illustrates moving a cassette into a space in a second chamber of a preheating chamber. FIG. 10 illustrates moving a preheating chamber onto an upper portion of a strengthening chamber. FIG. 11 illustrates immersing a cassette in a molten salt of a strengthening chamber. FIG. 12 illustrates moving a sliding plate.

Referring to FIG. 9, glass before or prior to strengthening may be accommodated in the cassette 50. The glass accommodated in the cassette 50 may be, for example, one of the glass articles illustrated in FIG. 1. The glass article may not have been subjected to strengthening. The cassette 50 may be transferred from another place by a tray and positioned in an appropriate or suitable place to be lifted by the cassette transfer part 60.

When the cassette 50 is placed under the preheating chamber 20, the cassette transfer part 60 may lift the cassette 50 upward and load it into the space S2 in the second chamber of the preheating chamber 20. Specifically, one side of the cassette 50 may be hung on the hook HK of the cassette transfer part 60, and the cassette transfer part 60 may transfer the cassette 50 to an appropriate or suitable position for preheating in the preheating chamber 20 by winding or unwinding the cable connected to the hook HK. In order to expose the second opening OP2 to the outside for receipt of the cassette 50 from the outside, the preheating chamber 20 may be disposed without overlapping the strengthening chamber 10 in the third direction DR3, and the sliding plate 30 may be disposed on the strengthening chamber 10 to cover the first opening OP1.

Referring to FIG. 10, after the cassette 50 is accommodated in the preheating chamber 20, the preheating chamber 20 may move along the guide part 40 in the first direction DR1 so that the second opening OP2 may face the first opening OP1 of the strengthening chamber 10. For example, the preheating chamber 20 may move toward the right side of FIG. 10 (as indicated by the arrow in FIG. 10). Accordingly, the preheating chamber 20, the sliding plate 30, and the strengthening chamber 10 may be disposed to overlap in the third direction DR3.

As the preheating chamber 20 is disposed on the sliding plate 30, the first induction coil IH1 and the second induction coil IH2 may be disposed to face each other with the cassette 50 and hook HK interposed therebetween. After the preheating chamber 20 moves, AC power may be applied to the first induction coil IH1 and the second induction coil IH2. Thus, the first and second induction coils IH1 and IH2 may generate eddy currents in the cassette 50 and/or the hook HK to inductively heat the cassette 50 and/or the hook HK. The first and second induction coils IH1 and IH2 are driven so that the directions of magnetic fields applied to the cassette 50 and/or the hook HK may coincide. Accordingly, the preheating efficiency of the cassette 50 and/or the hook HK may increase. At this time, the first heating element RH1 may also be driven together (e.g., concurrently) with the first and second induction coils IH1 and IH2, thereby indirectly heating the cassette 50 and the glass accommodated in the cassette 50. In one or more embodiments, the cassette 50 and/or hook HK may be preheated to a temperature of about 330° C. to about 340° C. (e.g., 330° C. to 340° C.) by the first and second induction coils IH1 and IH2, and the first heating element RH1 disposed in the preheating chamber 20. That is, the strengthened glass manufacturing apparatus 1 according to an embodiment not only indirectly heats the cassette 50 and/or the hook HK by the first heating element RH1, but also directly heats the cassette 50 and/or the hook HK by the first and second induction coils IH1 and IH2, so that a preheating time can be reduced (e.g., greatly reduced). In addition, in a molten salt containing potassium nitrate, salts are generated at a temperature of about 330° C. (e.g., 330° C.) in general. Because the strengthened glass manufacturing apparatus 1 according to an embodiment preheats the cassette 50 and/or the hook HK to have a sufficient temperature (e.g., a temperature greater than 330° C.), it is possible to prevent or reduce generation of salts due to the temperature difference between the cassette 50 and the molten salt in the strengthening chamber 10.

Referring to FIG. 11, after the cassette 50 and/or the hook HK is sufficiently preheated, the sliding plate 30 may move along the guide part 40 in the first direction DR1 so that the first opening OP1 of the strengthening chamber 10 may be opened. For example, the sliding plate 30 may move toward the left side of FIG. 11. At this time, the space S2 in the second chamber of the preheating chamber 20 may be in communication with the space S1 in the first chamber of the strengthening chamber 10 in the vertical direction. After the sliding plate 30 moves, the cassette transfer part 60 may transfer the cassette 50 from the preheating chamber 20 to the strengthening chamber 10. Specifically, the cable of the cassette transfer part 60 may be unwound, and thus the cassette 50 hung on the hook HK of the cassette transfer part 60 may move downward so that at least a part of the cassette 50 may be immersed in the molten salt contained in the space S1 in the first chamber of the strengthening chamber 10. In one or more embodiments, the cassette 50 may be mounted on the cassette mounting portion 10_CM provided in the space S1 in the first chamber of the strengthening chamber 10. Therefore, even after being separated from the hook HK of the cassette transfer part 60, the cassette 50 may be fixed in an appropriate or suitable position in the strengthening chamber 10.

Referring to FIG. 12, after the cassette 50 is transferred into the first space S1 in the first chamber of the strengthening chamber 10, the sliding plate 30 may move again along the guide part 40 in the first direction DR1 to close the first opening OP1 of the strengthening chamber 10. For example, the sliding plate 30 may move toward the right side of FIG. 12. As the sliding plate 30 is disposed on the strengthening chamber 10, the second induction coil IH2 and the third induction coil IH3 may be disposed to face each other with the cassette 50 interposed therebetween. After the sliding plate 30 moves, AC power may be applied to the second induction coil IH2 and the third induction coil IH3. Thus, the second and third induction coils IH2 and IH3 may generate eddy currents in the cassette 50 and/or the hook HK to inductively heat the cassette 50 and/or the hook HK. The second and third induction coils IH2 and IH3 are driven so that the directions of magnetic fields applied to the cassette 50 and/or the hook HK may coincide. Accordingly, the preheating efficiency of the cassette 50 and/or the hook HK may increase. In the meantime, the second heating element RH2 may also be driven together (e.g., concurrently) with the second and third induction coils IH2 and IH3, thereby indirectly heating the cassette 50 and the glass accommodated in the cassette 50. Therefore, the strengthened glass manufacturing apparatus 1 according to an embodiment may appropriately or suitably maintain the temperatures of the cassette 50, the hook HK, and the molten salt, thereby stably performing a glass strengthening process which is performed at a relatively low temperature ranging from about 340° C. to about 390° C. (e.g., 340° C. to 390° C.) without generation of salts.

When a set (e.g., predetermined) amount of time (e.g., about 10 to about 30 minutes) lapses after immersing the cassette 50 in the molten salt of the strengthening chamber 10, the sliding plate 30 may move again along the guide part 40 to open the upper portion 10_1 of the strengthening chamber 10. Then, the cassette transfer part 60 may lift the cassette 50 upward to take the cassette 50 out of the strengthening chamber 10.

Figure 13:
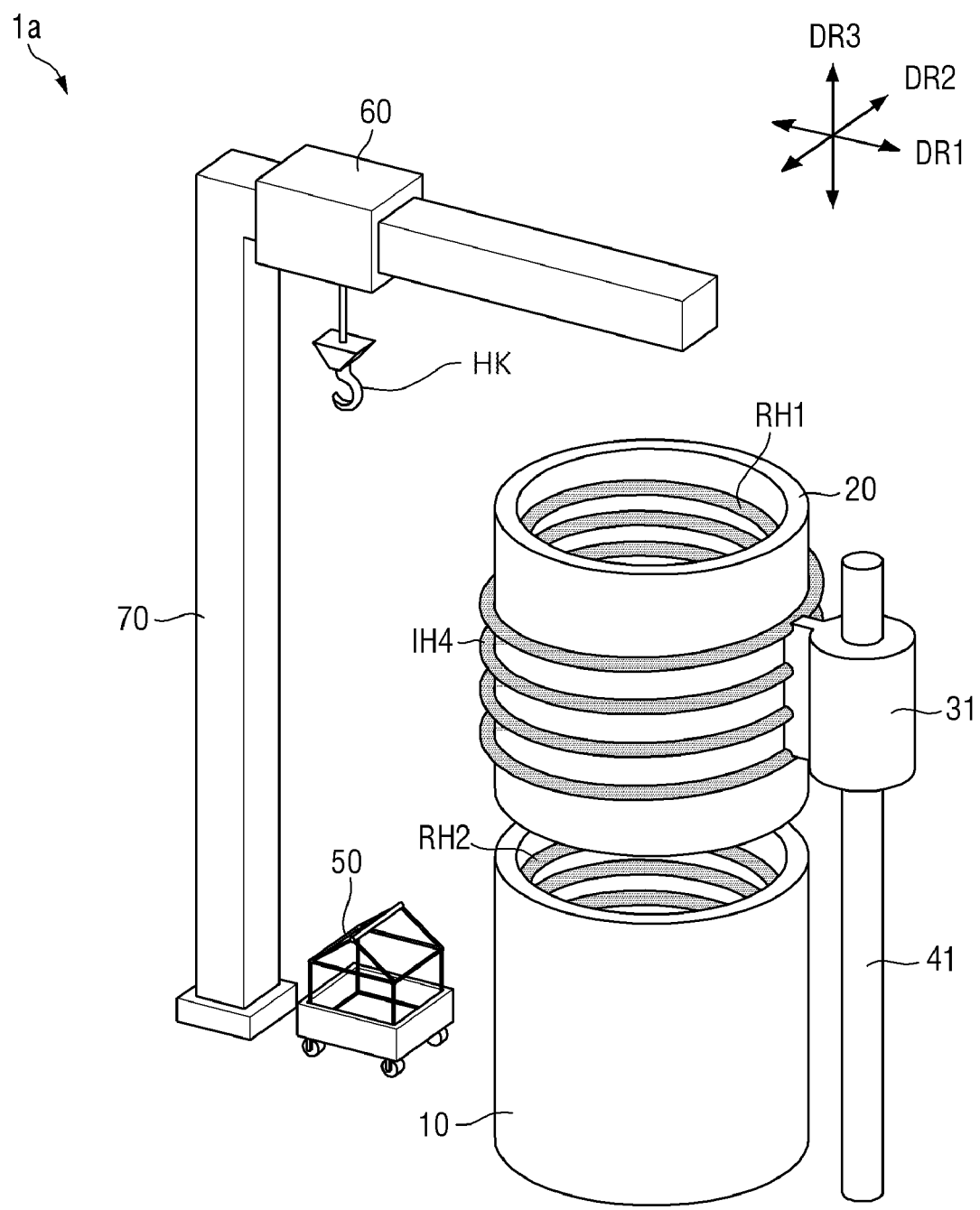
FIG. 13 is a perspective view of a strengthened glass manufacturing apparatus according to an embodiment.
Figure 14:
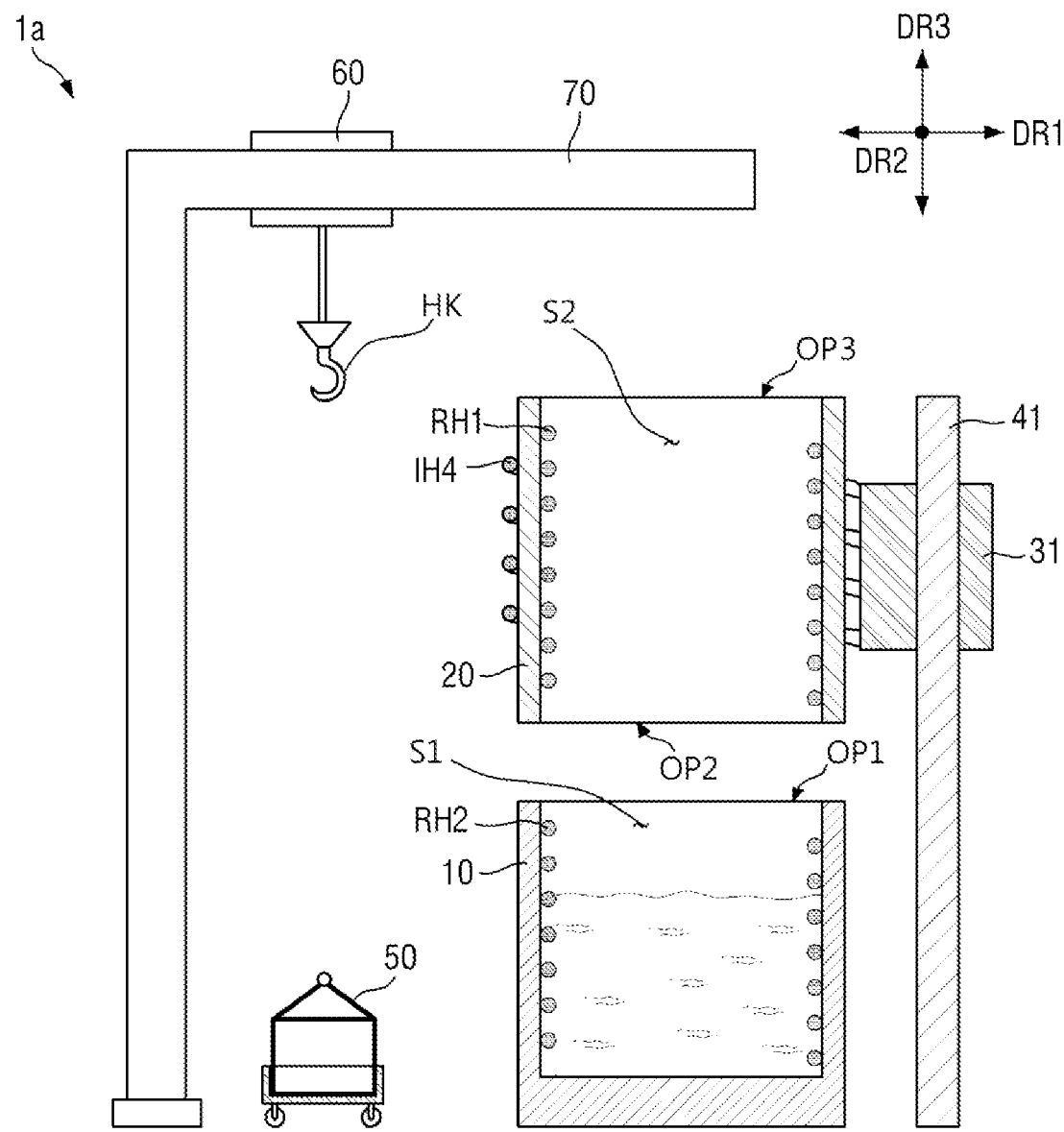
FIG. 14 is a cross-sectional view of the strengthened glass manufacturing apparatus of FIG. 13.

FIG. 13 is a perspective view of a strengthened glass manufacturing apparatus according to an embodiment. FIG. 14 is a cross-sectional view of the strengthened glass manufacturing apparatus of FIG. 13.

The embodiment of FIG. 13 is different from the embodiment of FIG. 6 in the shapes and the arrangements of the strengthening chamber 10, the preheating chamber 20, and the induction coils.

Referring to FIGS. 13 and 14, a strengthened glass manufacturing apparatus 1a may include the strengthening chamber 10, the preheating chamber 20, the cassette 50, the cassette transfer part 60, a fourth induction coil IH4, an induction coil moving part 31, an induction coil guide part 41, and a guide frame 70.

The strengthening chamber 10 has the space S1 in the first chamber, which contains a molten salt and communicates with the outside. The upper portion of the strengthening chamber 10 is at least partially opened to form the first opening OP1.

The preheating chamber 20 has the space S2 in the second chamber for preheating. The lower portion 20_3 of the preheating chamber 20 may be at least partially opened to form the second opening OP2, and the upper portion of the preheating chamber 20 may be at least partially opened to form a third opening OP3. That is, the space S2 of the second chamber may include a hollow that is opened upward and downward to communicate with the outside. For example, the preheating chamber 20 may be a tube with a passage extending in the third direction DR3 through the preheating chamber 20.

Unlike the embodiment of FIG. 6, the preheating chamber 20 may be fixed above the strengthening chamber 10 such that at least a part of the preheating chamber 20 overlaps the strengthening chamber 10 in the third direction DR3. In some embodiments, the strengthening chamber 10 may completely overlap the preheating chamber 20 in the plan view. The strengthening chamber 10 and the preheating chamber 20 may be aligned in the third direction DR3 so that the hollow or passage of the preheating chamber 20 may be in communication with the space S1 in the first chamber of the strengthening chamber 10. The preheating chamber 20 may be disposed to be spaced apart from (spaced from) the strengthening chamber 10 in the vertical direction. Alternatively, the preheating chamber 20 may be disposed to be in close contact with the upper portion 10_1 of the strengthening chamber 10.

The strengthening chamber 10 and the preheating chamber 20 may have the same shape and/or the same size in the plan view. Specifically, the strengthening chamber 10 and the preheating chamber 20 may have a cylindrical shape, and the outer diameter of the strengthening chamber 10 may be the same as the outer diameter of the preheating chamber 20. In some embodiments, the preheating chamber 20 may have the outer diameter greater than the strengthening chamber 10. FIG. 13 illustrates the strengthening chamber 10 and the preheating chamber 20 having cylindrical shapes, but the present disclosure is not limited thereto.

The strengthening chamber 10 and the preheating chamber 20 may be selectively inserted into the fourth induction coil IH4, which will be described in more detail below. The strengthening chamber 10 and the preheating chamber 20 may have sizes, for example, outer diameters smaller than the inner diameter of the fourth induction coil IH4 (described in more detail below) in the plan view.

The fourth induction coil IH4 may inductively heat the cassette 50 and/or the hook HK. The fourth induction coil IH4 may be disposed to be movable from the preheating chamber 20 to the strengthening chamber 10 and/or from the strengthening chamber 10 to the preheating chamber 20. The fourth induction coil IH4 may be disposed to surround (e.g., encircle or be around) the outer side surfaces of the strengthening chamber 10 and/or the preheating chamber 20 having the cylindrical shape. The fourth induction coil IH4 may inductively heat the cassette 50 and/or the hook HK by longitudinal flux induction heating. Specifically, the fourth induction coil IH4 may be formed of a spiral coil having an inner diameter greater than the outer diameters of the strengthening chamber 10 and the preheating chamber 20. The fourth induction coil IH4 may be moved up and down by the induction coil moving part 31 to selectively surround the strengthening chamber 10 and the preheating chamber 20. That is, in the embodiment of FIG. 13, one fourth induction coil IH4 for induction heating is arranged to be movable from the preheating chamber 20 to the strengthening chamber 10, and from the strengthening chamber 10 to the preheating chamber 20, unlike the embodiment of FIG. 6.

The induction coil moving part 31 is coupled to one side of the fourth induction coil IH4 and vertically moves the fourth induction coil IH4. Specifically, the induction coil moving part 31 may move the fourth induction coil IH4 upward from the strengthening chamber 10 so that the fourth induction coil IH4 may surround the outer side surface of the preheating chamber 20. Further, the induction coil moving part 31 may move the fourth induction coil IH4 downward from the preheating chamber 20 so that the fourth induction coil IH4 may surround the outer side surface of the strengthening chamber 10.

The induction coil guide part 41 is coupled to the induction coil moving part 31 and guides the moving direction of the fourth induction coil IH4. The induction coil guide part 41 may include a rod-shaped frame that extends in the vertical direction and penetrates or extends through the induction coil moving part 31, but is not limited thereto.

The cassette transfer part 60 may move the cassette 50 in at least one direction. For example, the cassette transfer part 60 may transfer the cassette 50 from the outside into the space S2 in the second chamber of the preheating chamber 20, and load the cassette 50 preheated in the preheating chamber 20 into the space S1 in the first chamber of the strengthening chamber 10. The cassette transfer part 60 may be arranged to be movable along a portion of the guide frame 70 (to be described in more detail below), which extends in the first direction DR1. The cassette transfer part 60 may include the hook HK.

The guide frame 70 may include a horizontal portion extending in the first direction DR1 (e.g., extending in the first direction DR1 to a position above the preheating chamber 20 and the strengthening chamber 10) to guide the movement of the cassette transfer part 60 and a vertical portion extending downward from an end of the horizontal portion.

The heating element RH may be disposed in the preheating chamber 20 and/or the strengthening chamber 10. The heating element RH may indirectly heat the cassette 50, the glass accommodated in the cassette 50 and/or the hook HK by resistance heating. The heating element RH may include the first heating element RH1 disposed in the preheating chamber 20 and the second heating element RH2 disposed in the strengthening chamber 10.

Because the embodiment of FIG. 13 is the same or similar to the embodiment of FIG. 6 except for the shapes and the arrangements of the strengthening chamber 10, the preheating chamber 20, and the induction coils, a redundant description will not be repeated below.

Hereinafter, the operation of the strengthened glass manufacturing apparatus 1a will be described in more detail with reference to FIGS. 15-17.

Figure 15:
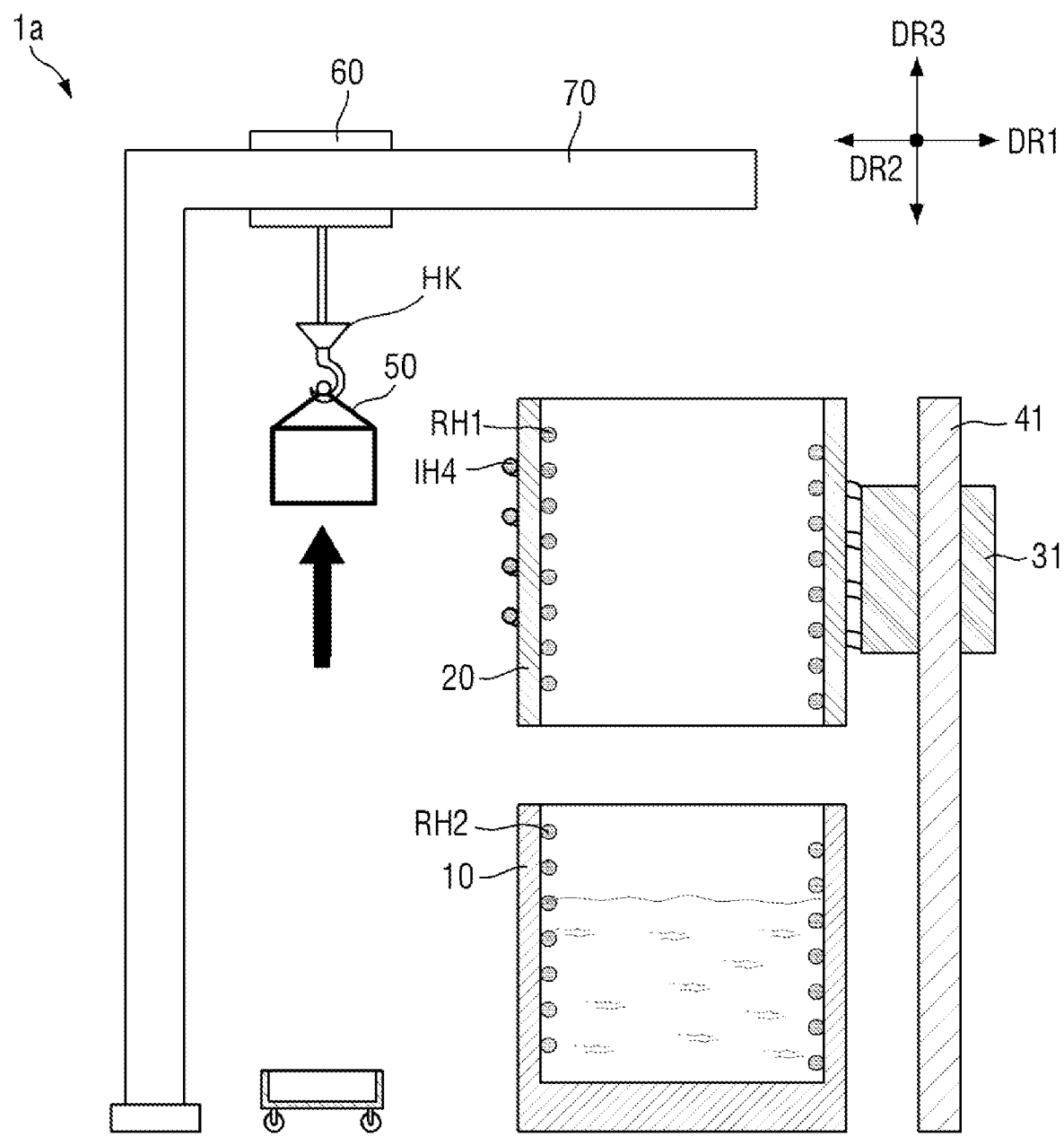
FIGS. 15-17 are cross-sectional views illustrating the operation of the strengthened glass manufacturing apparatus of FIG. 13.
Figure 16:
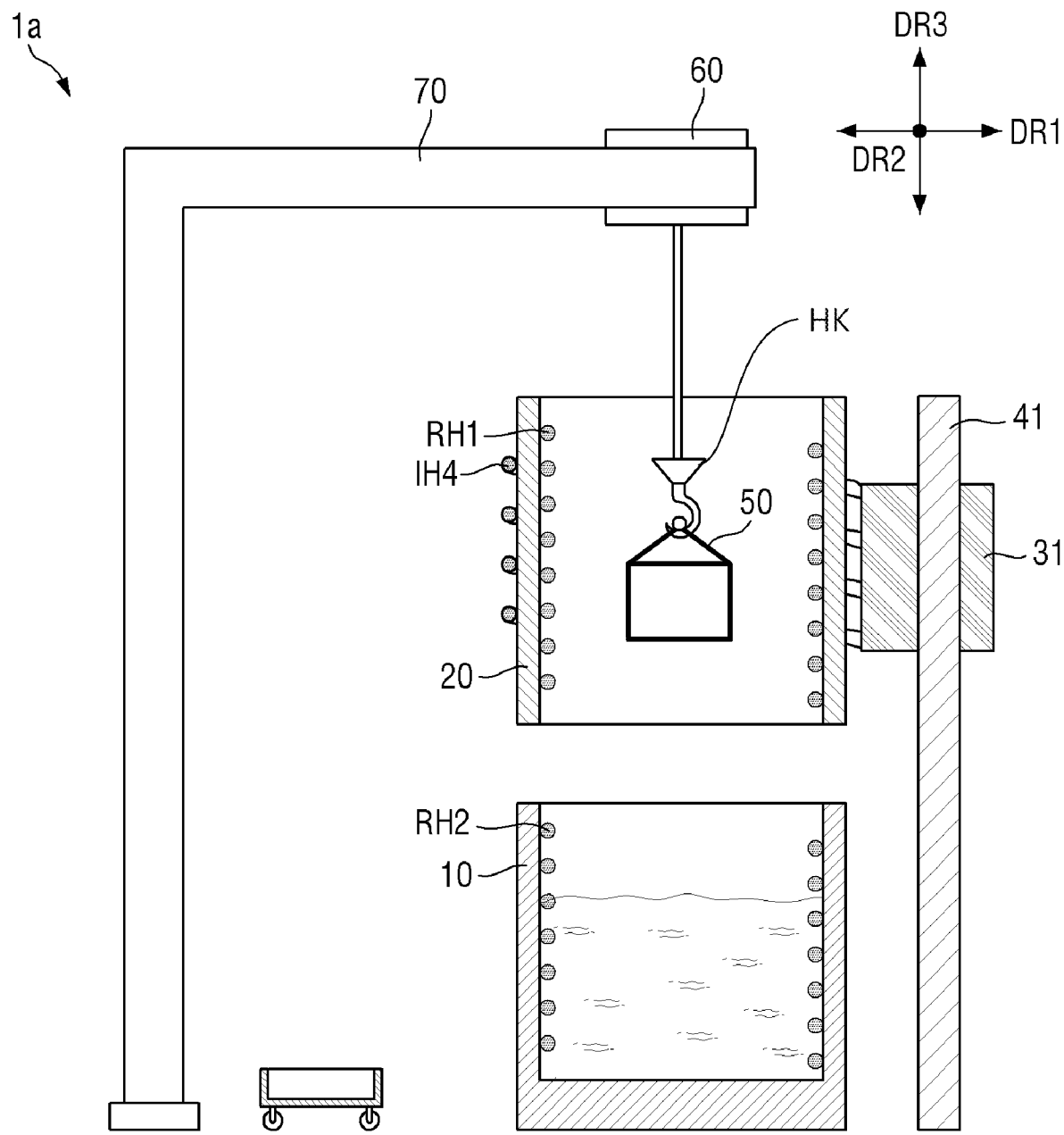
Figure 17:
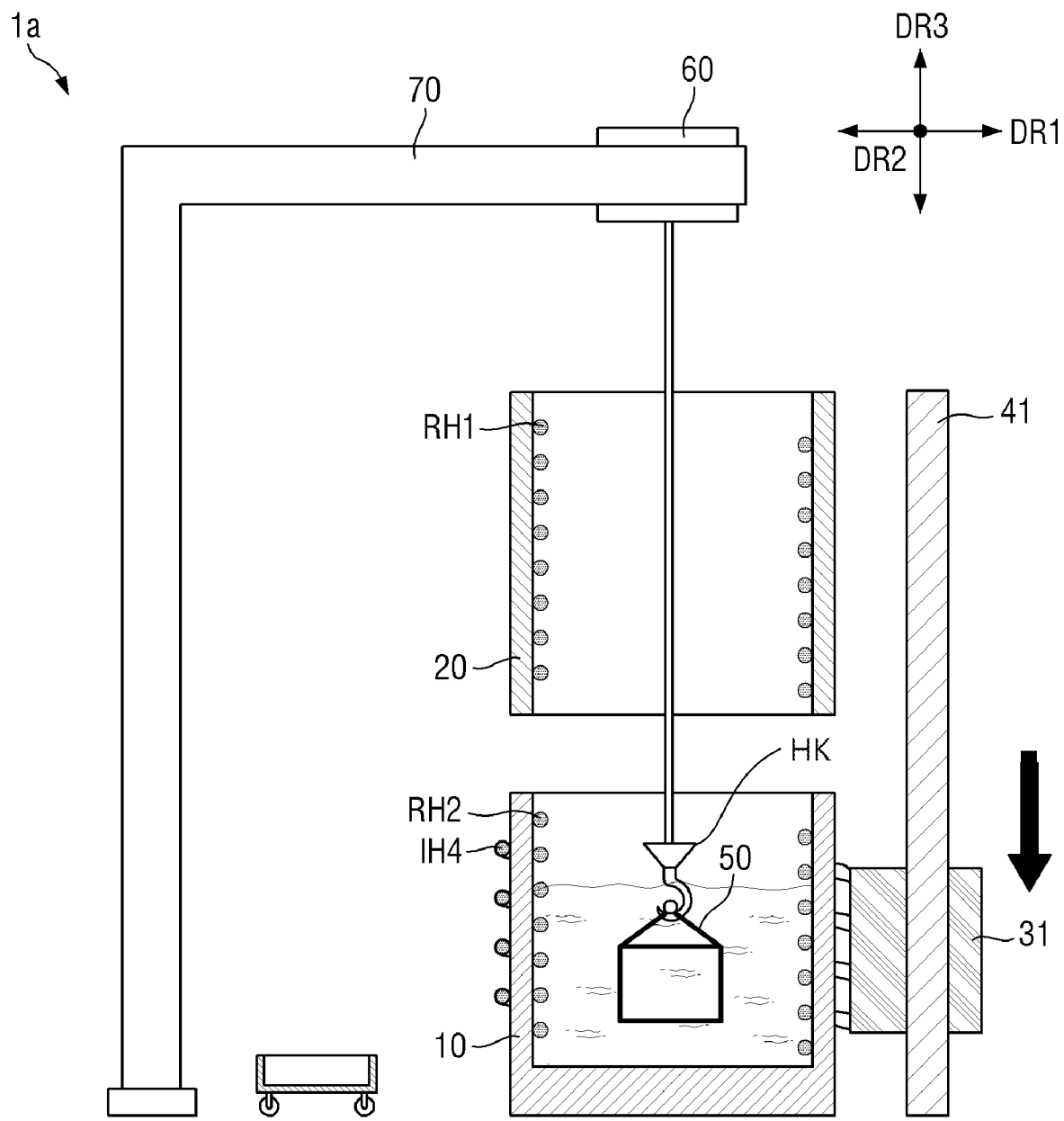

FIGS. 15-17 are cross-sectional views illustrating the operation of the strengthened glass manufacturing apparatus of FIG. 13.

FIG. 15 illustrates lifting up a cassette. FIG. 16 illustrates transferring a cassette into a preheating chamber. FIG. 17 illustrates immersing a cassette in a molten salt of a strengthening chamber.

Referring to FIG. 15, the hook HK of the cassette transfer part 60 may be coupled to one side of the cassette 50 mounted on an external tray, and the cable of the cassette transfer part 60 may be wound to lift the cassette 50 upward.

Referring to FIG. 16, the cassette transfer part 60 moves the cassette 50 along the guide frame 70 in the first direction DR1, and the cable is unwound from the upper side of the preheating chamber 20 to position the cassette 50 in the space S2 in the second chamber of the preheating chamber 20.

After the cassette 50 is accommodated in the space S2 in the second chamber of the preheating chamber 20, AC power may be applied to the fourth induction coil IH4. Thus, the fourth induction coil IH4 may generate eddy currents in the cassette 50 and/or the hook HK to inductively heat the cassette 50 and/or the hook HK. The fourth induction coil IH4 may be disposed in the preheating chamber 20 from the beginning or may be moved from the strengthening chamber 10 to the preheating chamber 20. At this time, the first heating element RH1 may be driven concurrently (e.g., simultaneously) with the fourth induction coil IH4 to promote preheating of the cassette 50 and/or the hook HK.

Referring to FIG. 17, after the cassette 50 and/or the hook HK is sufficiently preheated, the cassette transfer part 60 may move the cassette 50 downward to immerse the cassette 50 in the molten salt of the strengthening chamber 10. At this time, according to the movement of the cassette 50, the induction coil moving part 31 moves the fourth induction coil IH4 downward so that the fourth induction coil IH4 may surround the strengthening chamber 10. The fourth induction coil IH4 may continue to inductively heat the cassette 50 and/or the hook HK while the cassette 50 is kept in the strengthening chamber 10. The second heating element RH2 is driven together (e.g., concurrently) with the fourth induction coil IH4 to properly maintain the temperatures of the cassette 50, the hook HK and the molten salt, so that chemical reactions can be stably performed in the strengthening chamber 10.

When a set (e.g., predetermined) amount of time lapses after loading the cassette 50 into the strengthening chamber 10, the cassette transfer part 60 may lift the cassette 50 upward to take out the cassette 50 from the strengthening chamber 10.

Figure 18:
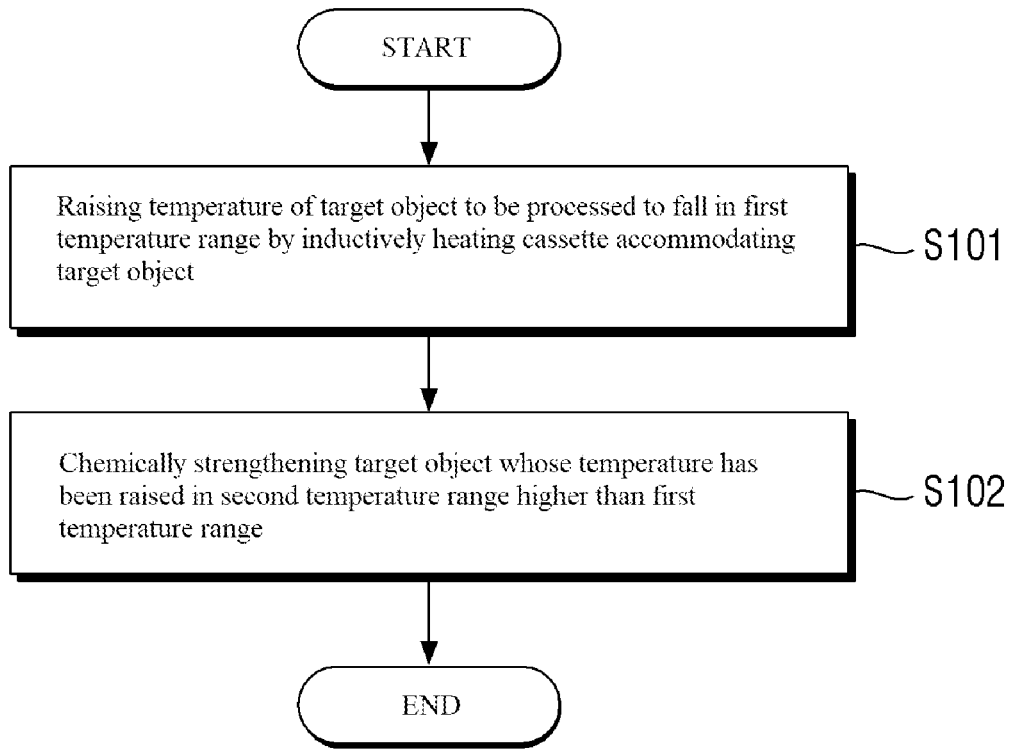
FIG. 18 is a flowchart of a strengthened glass manufacturing method according to an embodiment.

FIG. 18 is a flowchart of a strengthened glass manufacturing method according to an embodiment.

The strengthened glass manufacturing method may be performed by the strengthened glass manufacturing apparatus 1 of FIG. 6 or the strengthened glass manufacturing apparatus 1a of FIG. 13.

Referring to FIG. 18, the strengthened glass manufacturing method includes raising a temperature of a target object to be processed to fall in (or be at) a first temperature range by inductively heating the cassette 50 accommodating the target object (act S101), and chemically strengthening the target object, whose temperature has been raised, in a second temperature range that is higher than the first temperature range (act S102). The first temperature range and the second temperature range may be the second temperature range and the first temperature range of FIGS. 6-8, respectively.

The strengthened glass manufacturing method may further include at least one act of resistively heating the cassette 50 using at least one heating element RH, or inductively heating the hook HK hanging the cassette 50.

Referring to FIGS. 6-12, the act S101 of raising the temperature of the target object to fall in the first temperature range may include an act of inductively heating the cassette 50 using the first induction coil IH1 disposed on one side of the cassette 50 and the second induction coil IH2 disposed on the other side of the cassette 50. In this case, the first and second induction coils IH1 and IH2 may apply magnetic fields in the same direction to the cassette 50.

The act S102 of chemically strengthening the target object, whose temperature has been raised, in the second temperature range higher than the first temperature range may further include an act of inductively heating the cassette 50 using the second induction coil IH2 disposed on one side of the cassette 50 and the third induction coil IH3 disposed on the other side of the cassette 50. In this case, the second and third induction coils IH2 and IH3 may apply magnetic fields in the same direction to the cassette 50.

Referring to FIGS. 13-17, the strengthened glass manufacturing method may further include an act of moving at least one induction coil after raising the temperature of the target object to fall in the first temperature range.

The strengthened glass manufacturing method may omit at least one of the above-described acts, or may further include one or more other acts with reference to FIGS. 1-17.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A strengthened glass manufacturing apparatus comprising:
   a strengthening chamber comprising a first chamber having a first space;
   a preheating chamber comprising a second chamber having a second space, the second space being different from the first space;
   a first induction coil in the preheating chamber, the first induction coil in a shape of a horizontal plane spirally wound pancake coil defined by a horizontal plane parallel to a horizontal direction, the horizontal plane spirally wound pancake coil being above the second space, and the first induction coil in the shape of the horizontal plane spirally wound pancake coil being buried within an upper portion of the preheating chamber and surrounding a hole in the upper portion of the preheating chamber;
   a guide part extending in the horizontal direction from the strengthening chamber, and
   a cassette transfer part to move a cassette from the preheating chamber to the strengthening chamber, the cassette transfer part being arranged to pass a cable through the hole in the upper portion of the preheating chamber,
   wherein the preheating chamber is configured to move along the guide part from a first position where the preheating chamber does not overlap the strengthening chamber to a second position where the preheating chamber overlaps the strengthening chamber, and
   wherein the first induction coil is not horizontally coplanar with the second space and does not surround sidewalls of the preheating chamber.

2. The strengthened glass manufacturing apparatus of claim 1, further comprising a cassette to accommodate a target object to be processed, wherein the cassette is to be inductively heated in the second space of the second chamber by the first induction coil and is to be loaded into the first space of the first chamber.

3. The strengthened glass manufacturing apparatus of claim 2, wherein the cassette comprises a metallic material, and the first induction coil is to generate eddy currents in the cassette to heat the cassette.

4. The strengthened glass manufacturing apparatus of claim 3, wherein the metallic material comprises stainless steel.

5. The strengthened glass manufacturing apparatus of claim 2, wherein the target object comprises glass, and the strengthening chamber is to contain a molten salt to strengthen the glass.

6. The strengthened glass manufacturing apparatus of claim 5, wherein the molten salt is to have a temperature equal to or higher than 340° C. and equal to or lower than 390° C., and the cassette is to be preheated to a temperature equal to or higher than 330° C. and equal to or lower than 340° C.

7. The strengthened glass manufacturing apparatus of claim 1, wherein the first induction coil is in an upper portion of the preheating chamber.

8. The strengthened glass manufacturing apparatus of claim 7, further comprising a sliding plate between the strengthening chamber and the preheating chamber, and a second induction coil in the sliding plate to inductively heat a cassette.

9. The strengthened glass manufacturing apparatus of claim 8,
   wherein the sliding plate is configured to slide along the guide part in the horizontal direction.

10. The strengthened glass manufacturing apparatus of claim 9, wherein the sliding plate is configured to be placed under the preheating chamber such that the first induction coil and the second induction coil face each other.

11. The strengthened glass manufacturing apparatus of claim 9, wherein the preheating chamber is configured to move along the guide part such that a lower portion of the preheating chamber faces an upper portion of the strengthening chamber.

12. The strengthened glass manufacturing apparatus of claim 1, wherein at least one of the preheating chamber or the strengthening chamber comprises a heating element.

13. The strengthened glass manufacturing apparatus of claim 1, further comprising a third induction coil in a lower portion of the strengthening chamber.

14. The strengthened glass manufacturing apparatus of claim 1, wherein the strengthening chamber has a first opening at an upper portion thereof, and the preheating chamber is to be above the strengthening chamber and has a second opening at a lower portion thereof.

* * * * *